(12) United States Patent
Alban et al.

(10) Patent No.: US 11,579,618 B2
(45) Date of Patent: Feb. 14, 2023

(54) COVERAGE PLANNER

(71) Applicant: Scythe Robotics, Inc., Longmont, CO (US)

(72) Inventors: Marc Christopher Alban, San Antonio, TX (US); Zachary Austin Goins, Boulder, CO (US); Kristopher Charles Kozak, San Antonio, TX (US); John Gordon Morrison, Longmont, CO (US)

(73) Assignee: Scythe Robotics, Inc., Longmont, CO (US)

( * ) Notice: Subject to any disclaimer, the term of this patent is extended or adjusted under 35 U.S.C. 154(b) by 271 days.

(21) Appl. No.: 17/025,583

(22) Filed: Sep. 18, 2020

(65) Prior Publication Data

US 2022/0091613 A1 Mar. 24, 2022

(51) Int. Cl.
*G05D 1/02* (2020.01)
*A01D 34/00* (2006.01)

(52) U.S. Cl.
CPC ......... *G05D 1/0219* (2013.01); *A01D 34/008* (2013.01); *G05D 1/0217* (2013.01); *G05D 2201/0201* (2013.01)

(58) Field of Classification Search
CPC ............... G05D 1/0219; G05D 1/0217; G05D 2201/0201; G05D 2201/0208; G05D 1/0088; G05D 1/0212; A01D 34/008; G01C 21/3407; G01C 21/3446; G01C 21/30
See application file for complete search history.

(56) References Cited

U.S. PATENT DOCUMENTS

| 10,792,568 B1 * | 10/2020 | Merrill .................... A63F 13/56 |
| 2015/0296707 A1 | 10/2015 | Fukuda et al. |
| 2017/0344020 A1 | 11/2017 | Grufman et al. |

(Continued)

FOREIGN PATENT DOCUMENTS

| EP | 0664018 B1 | 7/1997 |
| JP | 3318170 B2 | 8/2002 |

(Continued)

OTHER PUBLICATIONS

Funnel Definition & Meaning—Merriam-Webster.pdf (https://www.merriam-webster.com/dictionary/funnel, Funnel Definition & Meaning—Merriam-Webster, 2022, pp. 1-7) (Year: 2022).*

*Primary Examiner* — Bao Long T Nguyen
(74) *Attorney, Agent, or Firm* — Moser Taboada

(57) ABSTRACT

Systems and techniques for generating a set of connected segments for a device or system to traverse in order to reach every point of the region (a coverage plan). Nodes defining the region to be traversed define a polygon. The polygon is decomposed into a mesh and a graph of the mesh is generated. The graph may be used to determine a longest funneled path which, in turn, may be used to either optimize for a longest path or to divide the polygon for eroding sides. The longest path and/or erosions are used to define a set of segments. The segments are connected, which in some examples is done via an optimization to minimize an amount of time or energy to traverse all segments and connections. The resultant coverage plan is sent to a system configured to receive the plan and traverse the region.

19 Claims, 13 Drawing Sheets

(56) References Cited

U.S. PATENT DOCUMENTS

| | | | |
|---|---|---|---|
| 2018/0103579 A1 | 4/2018 | Deimert et al. | |
| 2018/0139896 A1 | 5/2018 | Wahlgren | |
| 2018/0339409 A1 | 11/2018 | Bal et al. | |
| 2018/0361584 A1 | 12/2018 | Bal et al. | |
| 2018/0364045 A1 | 12/2018 | Bal et al. | |
| 2019/0049968 A1 | 2/2019 | Dean et al. | |
| 2020/0221633 A1* | 7/2020 | Einecke | G08C 17/02 |

FOREIGN PATENT DOCUMENTS

| | | |
|---|---|---|
| WO | WO-2016103065 A1 | 6/2016 |
| WO | WO-2018000922 A1 | 1/2018 |
| WO | WO-2018142482 A1 | 8/2018 |
| WO | WO-2018153599 A1 | 8/2018 |
| WO | WO-2018224678 A1 | 12/2018 |
| WO | WO-2019032864 A1 | 2/2019 |

\* cited by examiner

COVERAGE PLANNER

BACKGROUND

Certain tasks require a system to traverse the entirety of a given region. For example, when mowing a given area, it is important for a lawn mower to mow every portion of the area. If performed naively (e.g., by simply following a perimeter of the given area), the amount of time and energy needed to traverse the area may be inefficient. Worse, if a path the system follows to cover the given area does not traverse every region, the given task (e.g., mowing) may create areas which are not aesthetically pleasing and/or unresolved.

BRIEF DESCRIPTION OF THE DRAWINGS

The detailed description will now be described, by way of examples, with reference to the accompanying drawings, where like numerals denote like elements, a leftmost numeral indicates the original figure in which the element is found, and in which.

DETAILED DESCRIPTION

Figure 1:
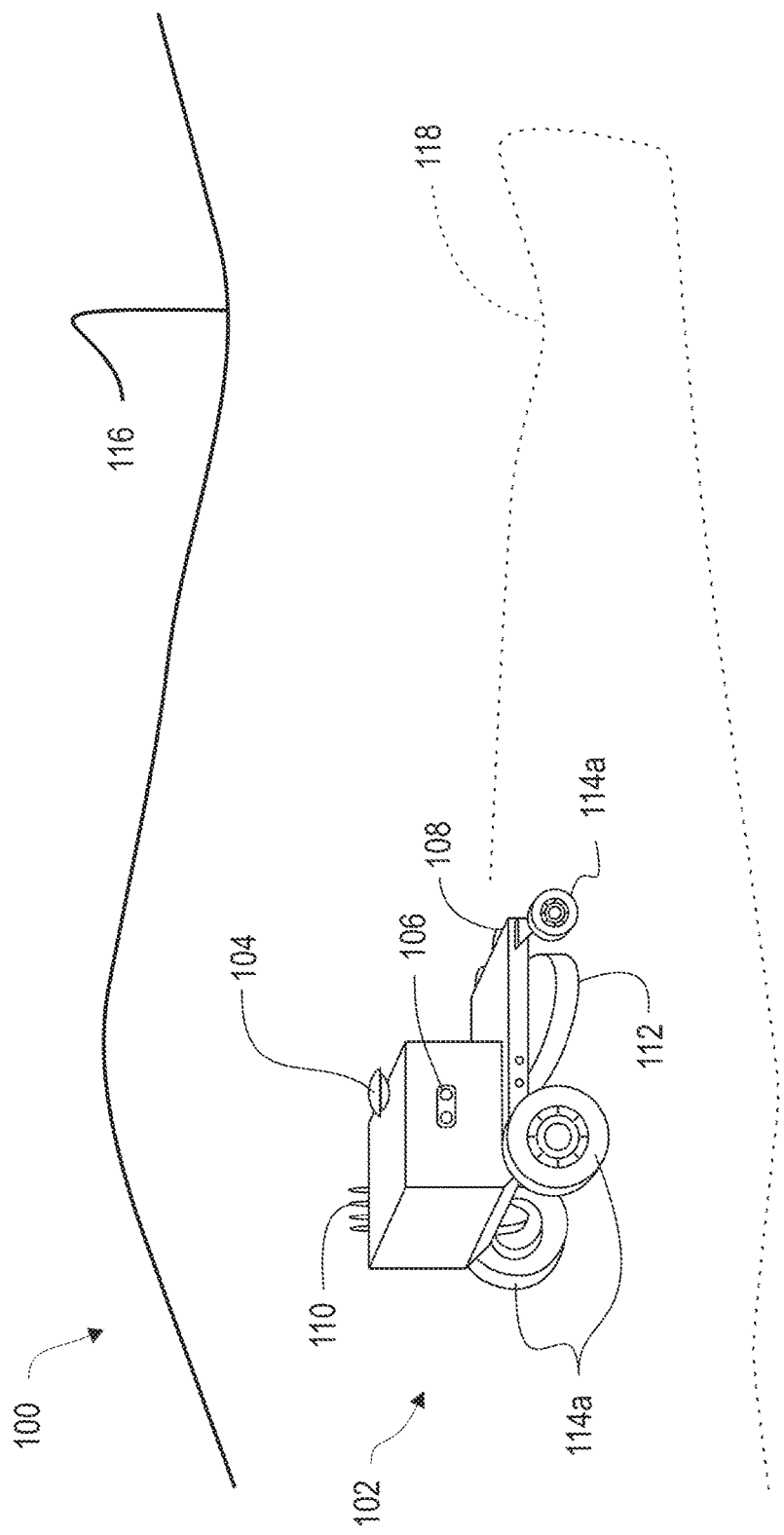
FIG. 1 illustrates an example of an autonomous lawn mower following a coverage pattern to mow a given area.

The following detailed description describes techniques (e.g., methods, processes, and systems) for determining an optimal path for traversing an area bounded by a polygon. As will be further described, a boundary may be provided indicating a region. The techniques describe the generation of an ideal pattern for a system to follow in order to minimize an amount of time to cover the entirety (or at least a majority of the area).

As will be described in detail herein, a system may receive a series of demarcations (or nodes) indicating the periphery of an area to be mowed. In various examples, such demarcations may be provided, for example, by a user providing input via a graphical user interface (GUI), a user logging GPS positions while traversing an area, or an operator controlling a lawn mower (whether autonomous, semi-autonomous, or manual) having sensors that are able to determine positions with respect to a reference frame (e.g., global, local, etc.). In various examples, such demarcations may comprise, for example, GPS locations, waypoints, Cartesian coordinates, latitudinal and/or longitudinal positions, and the like. Additional examples of determining and/or providing such demarcations are described in detail in U.S. patent application Ser. No. 16/985,495 entitled "Autonomous Lawn Mower" filed on Aug. 5, 2020, the entire contents of which are hereby incorporated by reference herein.

Such demarcations of nodes may define a bounded area of a polygon. In at least some examples, such nodes may define multiple polygons. As a non-limiting example of such, a first polygon may be indicative of a region to be mowed and one or more additional polygons may be provided that are indicative of obstacles within an interior of the region such as, but not limited to, trees, lakes, man-made objects (e.g., buildings, benches, sidewalks, etc.). In those examples in which multiple polygons are received, the techniques described herein may operate based on a difference in the given areas. As will be discussed in detail below, similar techniques may be used to find a longest funneled path and to determine various offsets and longest paths therefrom. The offsets and additional paths may be clipped by, for example, any of the additional polygon perimeters.

The area bounded by the polygon is then converted into a mesh. In some examples, such a mesh may comprise decomposing the area into one or more triangles in a process of polygon triangulation. Polygon triangulation may be accomplished, as a non-limiting example, using the earcut algorithm, or other similar algorithms including the greedy algorithm, the sweep-line approach, a Delauny triangulation, and the like. Of course, though described in detail herein as triangulation, any other meshing technique is contemplated including decomposing the polygon into convex meshes.

The triangulated mesh may then be used to determine a graph connecting representative points associated with the triangles of the mesh (e.g., a centroid, center of mass, etc.). Djikstra's algorithm (or otherwise) may then be used to traverse the graph to find a pair of triangles of the mesh that are furthest apart. The longest distance between two points of the pair of triangles may then be determined. In various examples, determining a longest distance between two points may further comprise use of a funnel algorithm. The funnel algorithm may be used to determine a funneled path that comprises the shortest distance between two points while remaining inside the polygon defining the bounded area. Such a funneled path may comprise one or more straight segments. In at least some examples, nine such funneled paths may be determined based at least in part on all combinations of connecting three vertices associated with the pair of triangles. Various optimization methods may be used on such funneled paths to determine a longest funneled path over the set of points comprising the periphery of the polygon.

A plurality of "struts" may be extended from the longest such path. A strut of the plurality may be a substantially perpendicular line to the longest path and extend to the boundaries of the polygon. In those examples in which multiple polygons are provided (or a region of the polygon is convex), such a strut may extend through (and be segmented by) all such polygonal areas. The number of such struts may be based on any number of parameters including, but not limited to, a user-defined constant, a size of an area of the polygon, or the like. In some examples, alternating ends of the struts may be connected to form a mow pattern that proceeds substantially perpendicular to the longest optimized path determined above. Such connections and struts may comprise a coverage plan and be transferred to a system (e.g., an autonomous lawn mower) to be controlled to traverse an area. In other examples, however, such a mow pattern may not be desired based on aesthetic, energy/time consumption, or other reasons.

In at least some examples, the strut is associated with a strut value. The value may be between 0 and 1, or any other range, and be indicative of a position along the strut such that an optimal point passing through the strut is parameterized by a single dimension. Strut values for at least a portion of the plurality of struts may then be optimized via, for example, an optimization, such as, but not limited to, a non-linear least squares optimization. Such an optimization may assign a cost to a path between all struts connecting points associated with the various strut values for the plurality of struts. The cost may comprise various component costs, a component cost based at least in part on a distance to the center of the strut from the optimal point, an angle of the path relative to a direction perpendicular to the strut, a curvature at the point (by smoothly connecting neighboring points), a change in curvature between neighboring struts, an amount the resultant path deviates from the defined perimeter (e.g., a Euclidian distance from the perimeter to the optimal point), a variation in distance between the path (connection between all optimized strut point) and the ends of the struts of one side or the other for any significant section of struts where the curvature is relatively constant, a smoothness to a resultant path connecting the optimal points, difference between the path and corresponding edges, or any other cost. The various component costs may have one or more weights associated with them and/or normalized so as to be within the relative metric space as one another. In at least some examples, one or more additional smoothing operations may be performed to ensure that the longest path is smooth throughout and/or based at least in part on capabilities and/or parameters of the system (e.g., a turning radius, width, etc.).

In various examples, the optimized longest path is then offset a plurality of times in either direction (either side of the path) and clipped based on the perimeter of the polygon (or polygons) to create a plurality of subpaths. The offsets may be based on, for example, a width of the mower, a desired level of overlap between mowing passes, an accuracy of a localization component of a mower, and the like. The main optimized path and the plurality of subpaths may be connected to generate a mow pattern (coverage plan), wherein connecting comprises generating an additional subpath between nodes (or endpoints) of the path or subpath with an additional node. Such connections may be determined, for example, by an optimization in which the length of time to traverse the mow path at a constant speed is minimized, an amount of energy to traverse all subpaths is minimized, or otherwise, though any other connection is contemplated such as, for example, simply connecting the nodes of adjacent subpaths (or the optimal path). The final connected coverage plan may then be transmitted to a system (e.g., an autonomous or semi-autonomous lawn mower, a user device, etc.) for following to completely cover the bounded area.

In some examples, the polygon defined may comprise complex perimeter shapes. In various examples, in order to improve the aesthetics of mowing such a bounded area, one or more additional or alternate steps may be used. Similarly, as above, the region may be divided into a triangular mesh (or otherwise). Vertices (or nodes) of the triangles may then be used to determine a longest path between any two of the vertices, such as by using Djikstra's algorithm, A*, D*, RRT, etc. In such examples, this longest path is used for dividing the polygon in two. Either side of the polygon is then eroded, as described in detail herein. When divided, each side is sometimes referred to herein as either a "left" side or "right" side for simplicity of illustration, though no such directional relationship need apply (as the paths may be above or below one another, or otherwise in opposing directions). Otherwise, such portions of the perimeter are designated as a first side and a second side.

Erosion, in various examples, comprises determining an initial offset path that follows the contour of the perimeter of each segment (e.g., a first and second initial offset following either the first side or the second side). Such an initial offset path may be offset from the perimeter by an offset (e.g., half a width of a deck of a lawn mower, more, or less, etc.) and/or a desired overlap between mowing stripes. Once the initial offset paths are defined, a subregion is determined based on a minimum and a maximum offset from a previously determined path (e.g., the initial offset path in a first iteration), creating a strip proximate the previous path. In determining such the subregion, a minimum and maximum offset may be defined per segment of the perimeter (e.g., portions between vertices or nodes) and clipped at an intersection point with neighboring segments. The minimum and maximum offsets may be determined by a user, based at least in part on a parameter of the lawn mower (e.g., a deck width), a desired amount of overlap, or the like.

A similar optimization as above may then be performed to determine the optimal path through the subregion (e.g., determining the longest funneled path through the subregion, determining a plurality of struts, and performing an optimization for points associated with the struts). Of course, the various weights and costs associated with the optimization may differ between the techniques described above and those described with respect to determining the optimal path through the subregion. Validation is then performed on the resultant paths (e.g., a first and second subsequent path output from the optimization associated with the first and second sides). In various examples, validation may comprise determining that the path output associated with a first side is closer to the associated first side than the other path (i.e., the portion of the path is valid) and/or, in at least some additional or alternative examples, that the subsequent path associated with a left side, for example, is always "left" of the path associated with the right side. Invalid portions of the path are then clipped (or discarded) at a clipping point. Portions of the curves (or paths) proximate the clipping point (an intersection between the two curves) may, in some examples, be smoothed based at least in part on, for example, a turning radius or other physical parameter associated with the lawn mower to ensure smooth and even coverage.

In various examples, the erosion is performed multiple times iteratively by each subsequent iteration eroding the path generated by the previous iteration. Such iterations may terminate once there are no valid curves/paths during a subsequent iteration. In such examples, the termination criterion ensures that the entirety of a region is filled (e.g., traversed) based on the plurality of paths determined. All such determined curves or paths may be connected either sequentially (e.g., creating a spiral by connecting nodes of neighboring paths) and/or based on an optimization as described herein (e.g., to minimize an amount of time to cover the area contained within the polygon, an energy required to traverse all path/subpaths, or the like).

In any of the examples described herein, various optimizations may be used to determine an order in which to traverse segments (paths, subpaths, or portions thereof) to form an overall coverage plan (or pattern). Such optimization may be to minimize an amount of time to cover the area while traversing all (or, in some examples, a portion of) the region, to minimize an energy required to traverse the region, or the like. In any such method, the optimization may be based at least in part on one or more of a start point or an end point received by the system (e.g., from a user). In at least some examples, such an optimization may comprise an ant colony optimization, though any other optimization method is contemplated. The ant colony optimization algorithm is a probabilistic technique for solving computational problems which can be reduced to finding good paths through graphs. Artificial Ants stand for multi-agent methods inspired by the behavior of real ants. The pheromone-based communication of biological ants is often the predominant paradigm used. Artificial 'ants' (e.g. simulation agents) locate optimal solutions by moving through a parameter space representing all possible solutions. Real ants lay down pheromones directing each other to resources while exploring their environment. The simulated 'ants' similarly record their positions and the quality of their solutions, so that in later simulation iterations more ants locate better solutions. In any of the examples described herein, any one or more of the paths, subpaths, segments, or the like may comprise nodes in a graph for such artificial ants to explore.

In at least some examples, a combination of one or more of the above referenced techniques may be used. As a non-limiting example, a region represented by a polygon having high frequency features (e.g., having any of complex shapes, areas of high concavity or convexity, areas of rapidly changing alignment/orientation, or the like) along the perimeter may be first eroded a number of times to determine a first set of paths or subpaths to follow for a first portion of the region proximate the high frequency perimeter. The number of times that the portion is eroded may be a fixed amount (e.g., 1, 2, 3, 4, 5, or more times) or otherwise until a remaining interior portion is relatively smooth (comprises little to no high frequency regions). The remaining interior portion (that portion not associated with any paths from the erosions) may comprise a low frequency (or smooth) polygon. Such a region may alternately be referred to herein as a subpolygon. A mow pattern through the smooth polygon may then be determined based at least in part on the techniques described in detail above by determining a plurality of offset paths from a longest path through the subpolygon. The plurality of subpaths determined based at least in part on both techniques may be combined based on any one or more of a desired start point, a desired end point, a minimization of time to cover an area, or the like.

In any of the examples above, one or more additional paths may be added to the coverage plan to follow the boundary of the perimeter in order to ensure clean looking cuts when mowed. The additional paths may be the same (e.g., 100% overlapping) and/or have one or more additional offsets, as described in detail above. Such additional paths may, in at least some examples, be added to the end of the optimized coverage plan and/or to the end of the coverage plan such that the perimeter is cleaned before and/or after mowing.

In various examples described herein, the coverage plan determined may then be transmitted or received by a system (or subcomponent of a system) for controlling the system to follow the pattern. In a non-limiting example, an autonomous lawn mower may receive the coverage plan (or mow pattern) and control one or more actuators to follow the pattern over a given area.

Further, though described in detail herein as two-dimensional, the description is not meant to be so limiting. As a non-limiting example, topographies of an area may be taken into account when, for example, determining the longest funneled path, generating the struts, generating the plurality of subpaths, generating the various connections between subpaths, or the like.

The techniques described in detail herein may improve the functioning of a computer. As a non-limiting example, the techniques may reduce the computational requirements (e.g., processing power, memory required, etc.) needed to determine an optimal path for a system to follow in order to traverse all spaces within a bounded area.

Although described herein with respect to a lawn mower for purposes of illustration, the description is not meant to be so limiting. Any of the techniques, processes, and systems described herein may be used in conjunction with other agricultural and landscaping devices including, but not limited to weed eaters/wackers, edgers, trimmers, and the like, as well as any other power equipment or systems for covering an area. Details of such a system are described in detail below with respect to the figures.

FIG. 1 illustrates an example of a system 100 for an autonomous lawn mower 102 to follow a mow pattern to mow a given region. The autonomous lawn mower 102 may comprise one or more sensors. As illustrated in FIG. 1, autonomous lawn mower is depicted with one or more Global Navigation Satellite System(s) (GNSS) 104, image sensors 106 (which may be RGB, monochromatic, infrared, ultraviolet, etc., as well as form the basis of stereo- (as depicted) or multi-view systems), and radar(s) 108. Though not depicted, the autonomous lawn mower 102 may comprise any other form of sensor for detecting environmental parameters and/or a state of the autonomous lawn mower 102 such as, but not limited to, lidar(s), inertial measurement unit(s) (IMU), accelerometer(s), gyroscope(s), magnetometer(s), wheel encoder(s), ultrasonic transducer(s), thermal imagers, ambient light sensor(s), time of flight sensors, barometer(s), bolometer(s), pyrometer(s), tilt sensor(s), and the like. Such sensors may be disposed about the autonomous lawn mower 102 in poses (i.e., positions and/or orientations) determined to optimize a field of view of all such sensors when combined. Image sensors 106 may comprise narrow field of view cameras and/or wide-angled cameras. Multiple image sensors 106 may be disposed about the autonomous lawn mower 102 to create various baselines (including dual baselines). All such sensors may be calibrated to determine one or more of intrinsics or extrinsics of the sensors.

The autonomous lawn mower 102 may further comprise, as depicted in the example illustrated, one or more antennae 110. Such antennae 110 may be used for one or more of wireless network communication, GNSS/GPS satellite reception, or any other form of electromagnetic signal transmission/reception.

The autonomous lawn mower 102 further comprises a deck 112. The deck 112 provides a housing for one or more blades in order to protect nearby objects from injury, to protect damage to the blades, as well as to control how vegetation is cut and directed after cut (e.g., to be ejected as mulch from the side of the deck 112, collected in a bag, or otherwise).

As depicted, the autonomous lawn mower 102 comprises a plurality of wheels 114. In at least some examples, two rear wheels 114(a) may be independently driven by one or more motors while front wheels 114(b) are attached on castors allowing them to freely rotate.

When mowing, the autonomous lawn mower 102 may be provided with a perimeter 116. The perimeter 116 may form the boundary of a given area for the autonomous lawn mower 102 to cover. As described in detail herein, a coverage planner may generate a coverage plan for the autonomous lawn mower to follow. The coverage plan may comprise a path 118 and/or series of subpaths for the autonomous lawn mower 102 to traverse. The coverage plan may ensure that the autonomous lawn mower visits every region of the area bounded by perimeter 116 and, in at least some examples, in an efficient manner to minimize a total time to mow, an amount of energy required to mow, and/or so as to result in a desired aesthetically pleasing pattern.

Figure 2A:
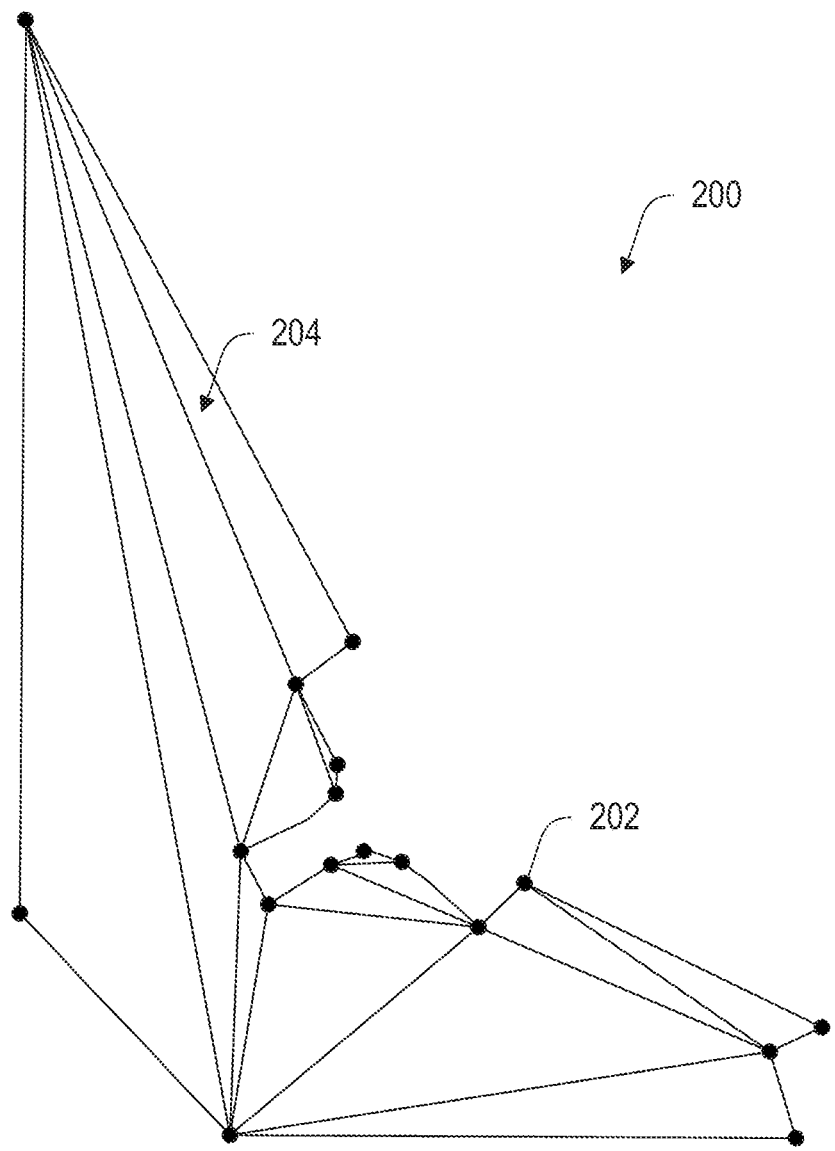
FIG. 2A depicts an example decomposition of a perimeter into a resultant mesh based at least in part on a number of nodes.

FIGS. 2A-2E represent an example of at least some of the steps to generate a coverage plan. FIG. 2A illustrates an example polygon 200 from which a coverage plan is generated. As depicted, the polygon 200 may comprise one or more nodes 202. As described in detail above, the one or more nodes may be provided by a user (e.g., via a GUI—such as by demarcating a perimeter on a map, by acquiring waypoints when walking a field, or otherwise), by an autonomous or semi-autonomous lawn mower traversing the perimeter and performing localization or recording waypoints, or the like. Additional details of determining such nodes or waypoints is described in detail in U.S. patent application Ser. No. 16/985,495 entitled "Autonomous Lawn Mower" filed on Aug. 5, 2020, the entire contents of which are hereby incorporated.

As described in detail above, the nodes 202 may, in some examples, be used to decompose the polygon into a mesh. As illustrated in FIG. 2A, such a mesh may comprise a triangle mesh composed of a plurality of triangles 204 using, for example, an earcut algorithm. Of course, the description is not meant to be so limiting. Any number of algorithms may be relied upon to decompose the larger mesh into a series of smaller convex shapes.

Figure 2B:
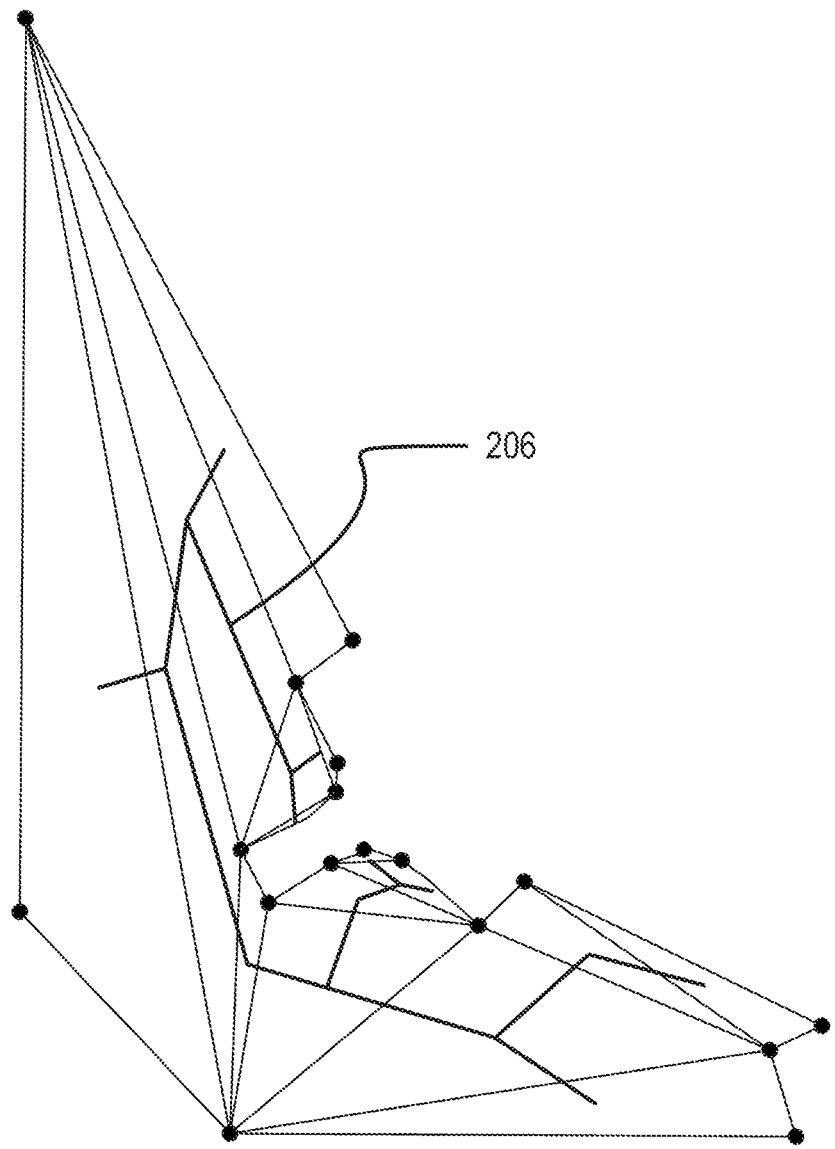
FIG. 2B shows an example graph of the resultant triangle mesh of FIG. 2A.

FIG. 2B illustrates a graph 206 which is generated connecting the plurality of triangles 204. The nodes of such a graph 206 may comprise a centroid of an area, centroid of the nodes of the triangles, center of mass, or the like of a triangle of the plurality of triangles and connections may be based on one or more of nearest neighbors, adjacent triangles, or the like.

Figure 2C:
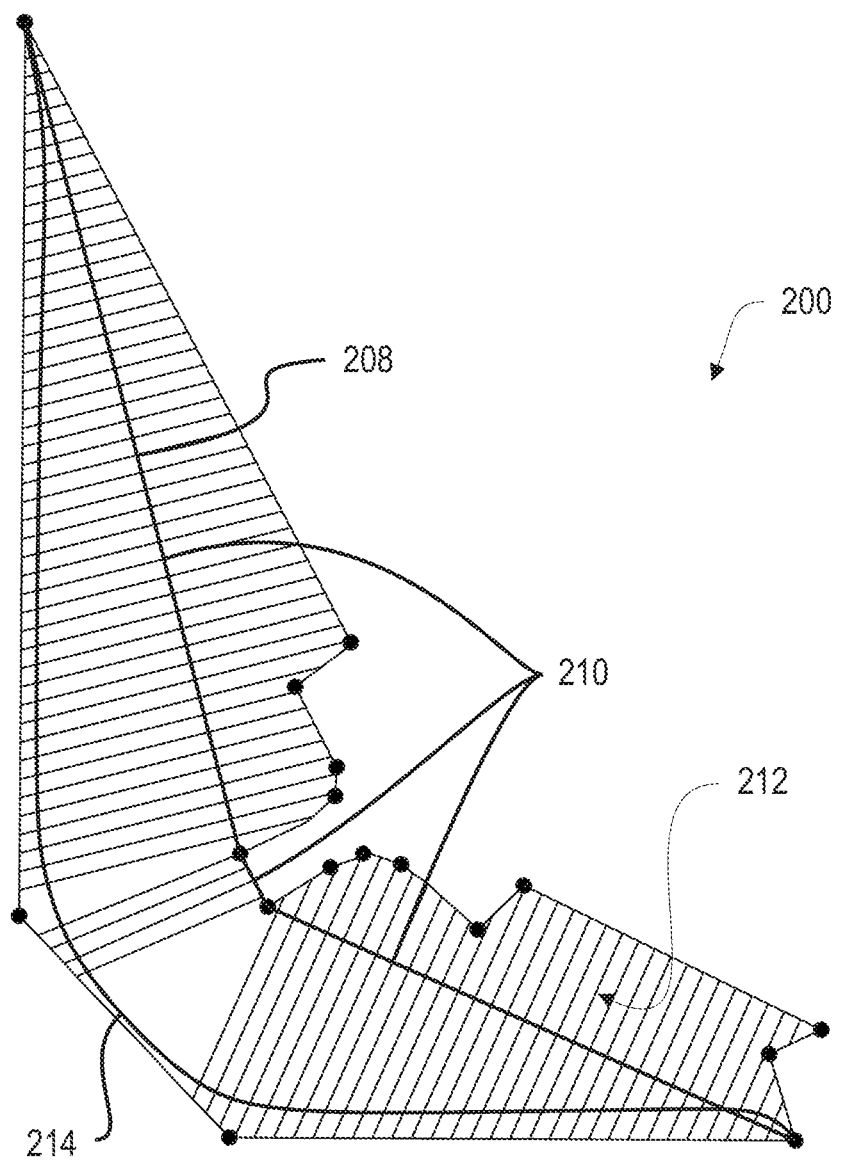
FIG. 2C depicts an example longest path between nodes.

FIG. 2C illustrates using the graph of FIG. 2B to determine a longest funneled path 208 in between any two nodes of the triangles. Pairs of nodes of triangles on opposing ends of the graph may be selected. As described in detail above, a funneling algorithm may then be used to find the shortest distance between the two nodes which are farthest apart such that the funneled path results in a path which does not leave a perimeter of the polygon 200. Here, the longest funneled path 208 is determined based on one or more of an optimization among the plurality of potential pairs of nodes (e.g., by traversing the graph and selecting a node from a triangle of either end) and/or by iteratively comparing funneled paths determined by such nodes to find the longest.

The longest funneled path 208 is then subdivided into a number of funneled segments 210. A set of struts 212 is then determined for one or more of the funneled segments 210. The struts 212 may be normal to and, in at least some examples, evenly spaced along a funneled segment of the plurality of funneled segments 210. The struts 212 may by "clipped" or limited based at least in part on the perimeter of the polygon 200. In other examples, not illustrated in FIG. 2C, additional struts may be interpolated between straight portions or segments of the longest funneled path. In such examples, such additional struts may be equally spaced angularly in the transition regions. By providing such additional struts, a smoother longest path may be determined. In those regions in which the perimeter clips the strut multiple times, the optimal point may be confined to one or more of the portion of the strut through which the longest funneled path is associated and/or the portion of the strut closest to an adjacent strut and/or optimal point (as described in detail below).

Once struts 212 are determined, an optimization is performed to find a point along the one or more struts 212 based at least in part on one or more costs. The one or more costs may comprise, but are not limited to, a curvature at the point, a distance to the center of the strut 212, a distance to a border of the polygon, a smoothness, or the like. The resultant connection between such optimized points may be the longest path 214.

Figure 2D:
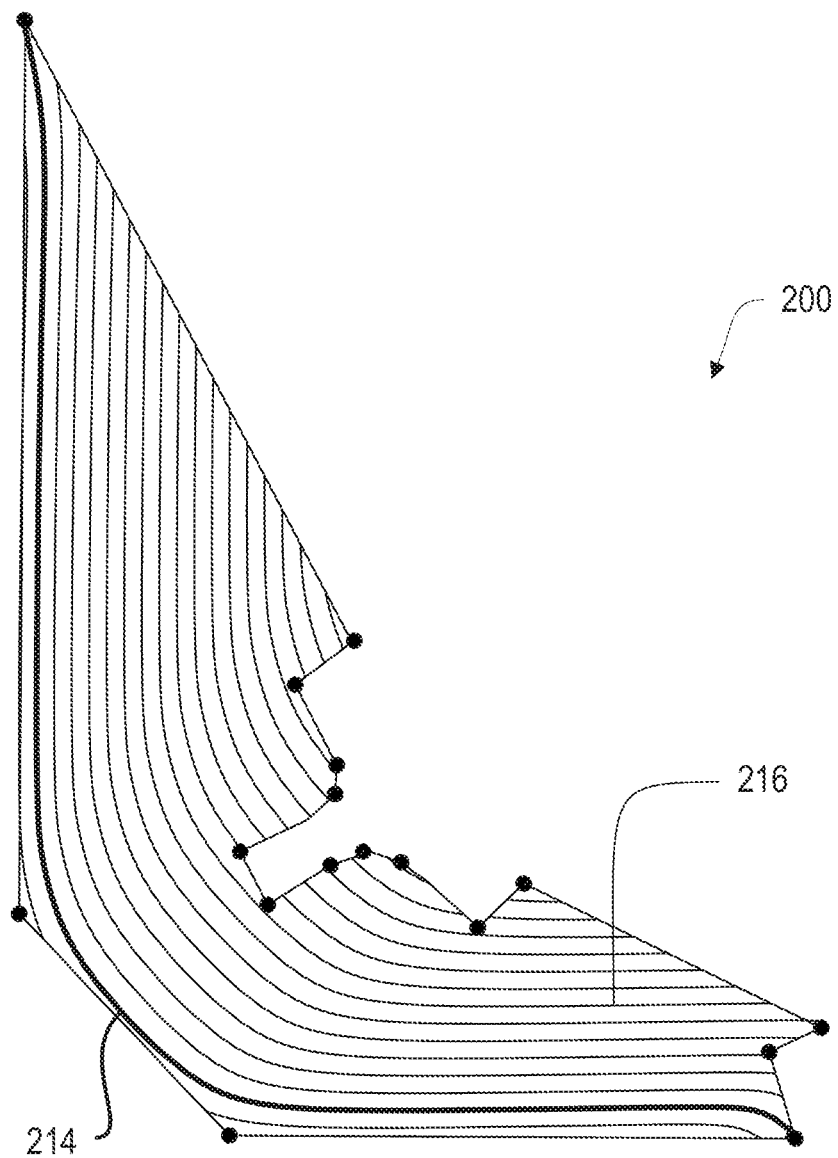
FIG. 2D shows generated clipped paths from the longest path of FIG. 2C.

FIG. 2D shows the longest path 214, as well as a series of offsets 216 of the longest path 214. The offsets 216 may be spaced based at least in part on, for example, one or more of a width of the system to traverse the area (e.g., a lawn mower width) and/or a desired overlap between passes from pass to pass. The offsets 216 may be clipped by the perimeter of the polygon 200 (e.g., finding the segments of the offsets 216 which intersect with the perimeter) which results in one or more subpaths.

Figure 2E:
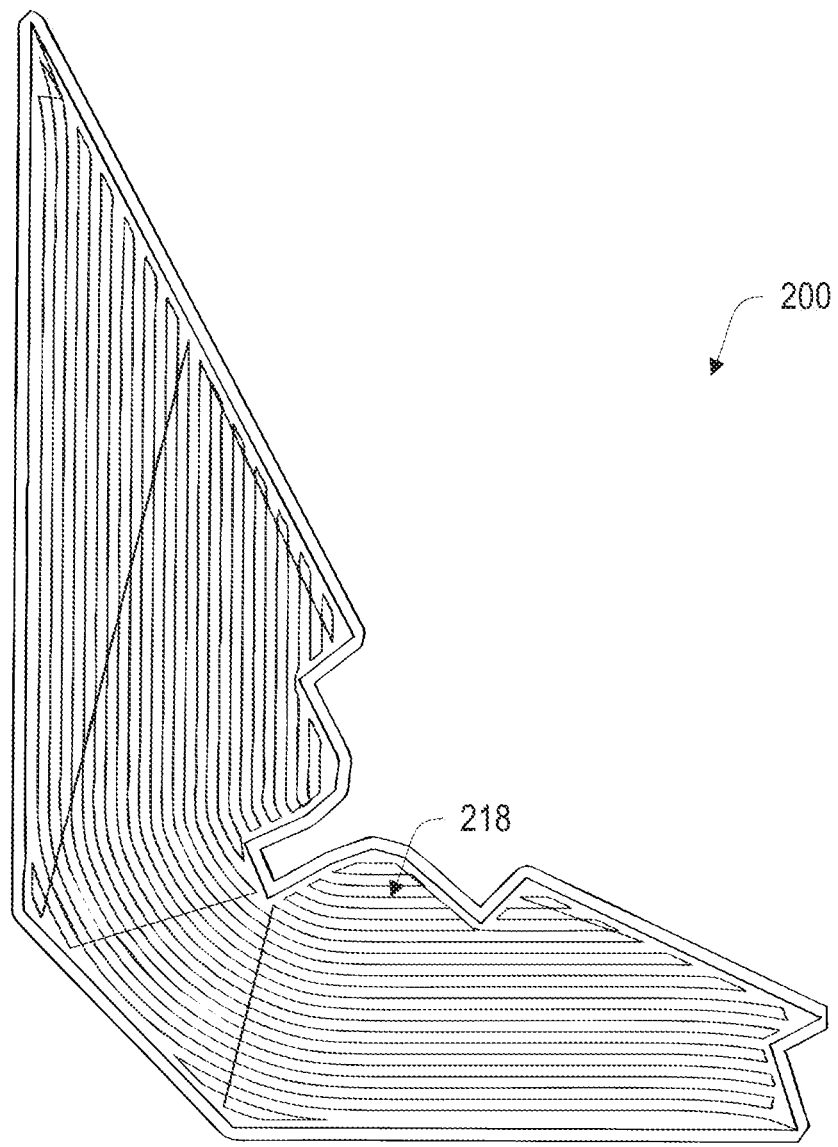
FIG. 2E illustrates the resultant coverage plan generated based at least in part on the clipped paths of FIG. 2D.

FIG. 2E illustrates an example of connecting the one or more subpaths depicted in FIG. 2D. As shown, once the one or more subpaths are determined, a final coverage plan 218 may be determined based at least in part on the start and end nodes of the subpaths. In at least some examples, an optimization may be performed to determine such connections which minimizes one or more of a time to cover the area (e.g., assuming a constant speed), an energy required to mow, or otherwise. As described in detail above, such an optimization may comprise an ant colony method by which each subpath comprises a node and wherein the optimization determines the connections therebetween so as to minimize one or more of a time to traverse the resultant coverage plan, to minimize an amount of energy required, or otherwise.

Figure 3A:
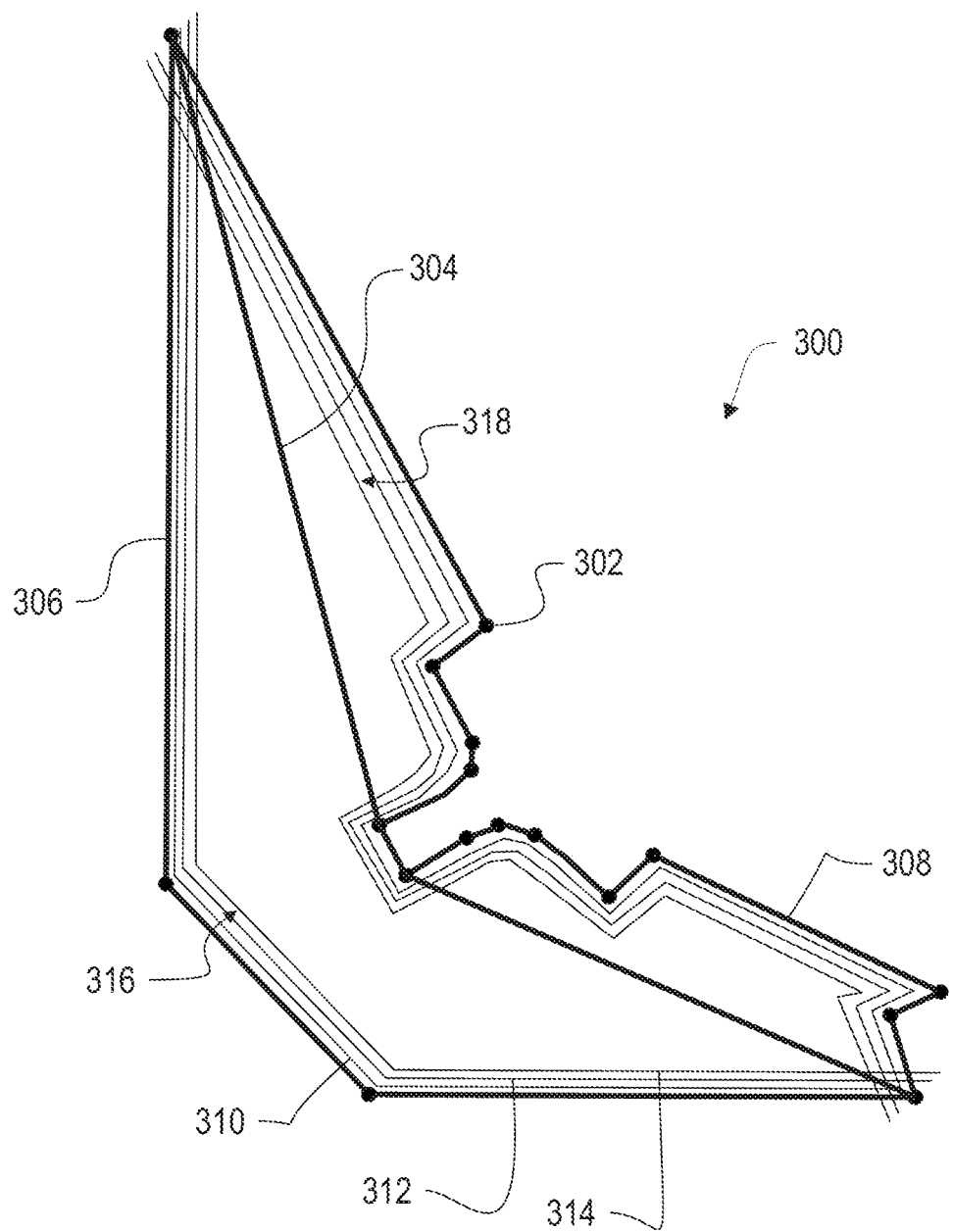
FIG. 3A illustrates an example decomposition of a perimeter into first and second portions and resultant subregions.
Figure 3B:
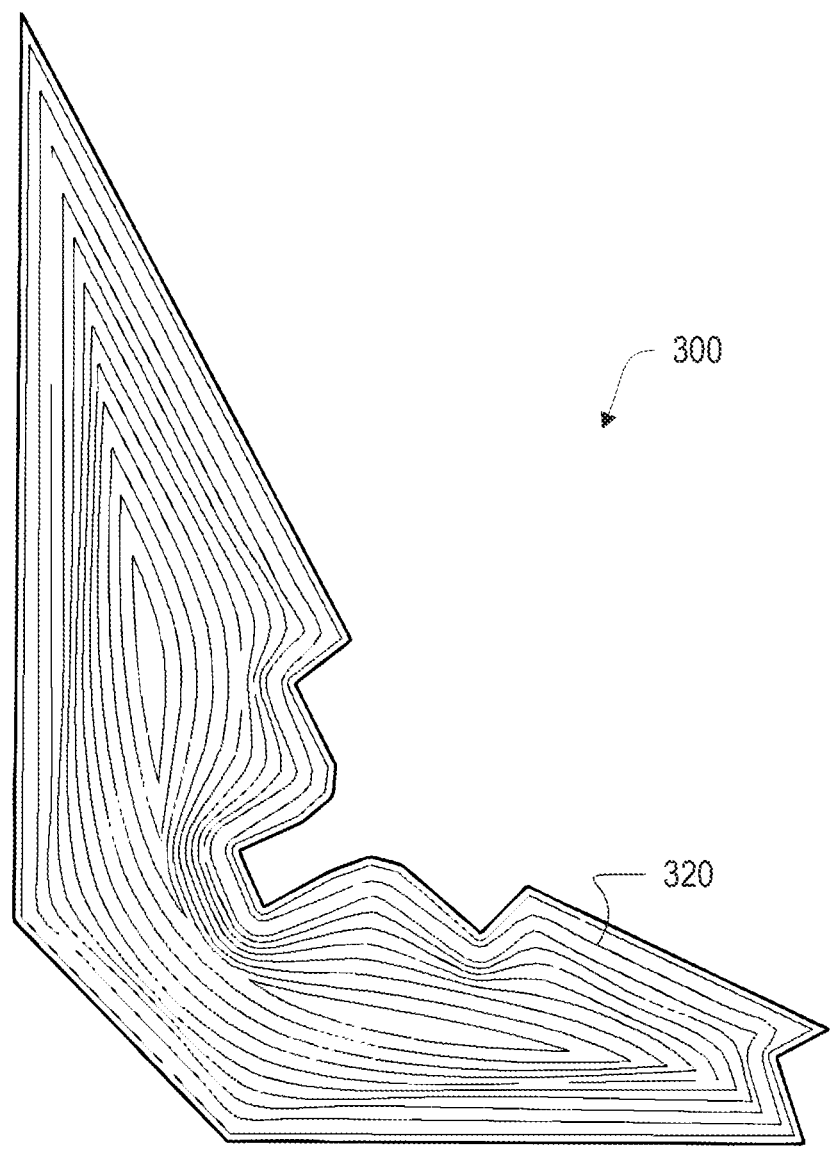
FIG. 3B depicts an example coverage plan generated based at least in part on the continued iteration of subpath generation of FIG. 3A.

FIGS. 3A and 3B illustrate an additional or alternate example of determining a coverage plan. Turning first to FIG. 3A, a similar polygon 300 is shown. As above, the polygon 300 may be defined by a number of nodes 302. Again, a longest funneled path 304 may be determined (e.g., by subdividing the polygon 300 into a triangular mesh, determining a graph which connects the mesh, and finding the longest funneled path which connects any two nodes of the triangles associated with the graph). In the technique illustrated in FIG. 3A, however, the longest funneled path 304 is used to subdivide the polygon into two sides, a first side 306 and a second side 308. The first side 306 may be the portion of the polygon between the pair of nodes associated with the longest funneled path 304 and the second side may be an opposing (or remaining) portion of the polygon between the pair of nodes. Additionally, a first initial offset 310 is defined (whether before or after dividing polygon 300) that presents an offset from the first side 306 and the second side 308. In at least some examples, the offset may be determined based at least in part on a physical parameter of the system. As illustrated, the offset comprises a percentage of the width of the lawn mower to traverse the area (e.g., 50%).

The first initial offset 310 is then used as a starting point for iteration. In an iteration, a minimum offset 312 and maximum offset 314 may be determined based at least in part on, for example, a width of the lawn mower, a desired amount of overlap, or the like. A first subregion 316 associated with the first side 306 may then be defined as the region between the minimum offset 312 and the maximum offset 314 proximate the first side 306. Similarly, a second subregion 318 is defined based on the region between the minimum offset 312 and the maximum offset 314 proximate the second side 308.

The first and second subregions 316, 318 are then used to determine a first path and a second path (not illustrated for clarity). The first and second paths may be determined based on techniques described with respect to FIG. 2 (e.g., defining the first and second region as a plurality of nodes, decomposing the regions into a mesh, creating a graph of the mesh, finding the longest funneled path, creating struts, and optimizing points of the struts). Such resultant first and second paths may be validated. Validation, as described above, may comprise determining the portions (or segments) of the first and second path which comport with a set of rules. In some such examples, validation may comprise determining one or more intersection points between the two paths and determining a sign associated with the portions between such intersections (and/or endpoints). In some such examples, the sign may be indicative of crossing from one side of the polygon to the other. In various examples, such determinations may be performed in order (one side then the other), whereas in other examples the determination may be performed substantially simultaneously (e.g., within technical tolerances). An example of such a rule may require that the first path is always closer to the first side 306 than the second path (and/or that the second path is always closer to the second side 308 than the first path). Intersections between the first and second paths may be used to determine decision regions for sampling validity.

Once determined, the first and second paths may be used as the basis for successive iterations (and/or, in at least some examples, only the valid portions thereof). In an example, minimum and maximum offsets from the first path may be determined to define an additional subregion to find a resultant third path which is validated against a fourth path determined similarly from the second path and so on. One or more termination criteria may be used such as, but not limited to, determining that there are no valid paths output in a successive iteration.

FIG. 3B illustrates continued iteration of eroding a boundary until some termination criterion is satisfied. As illustrated in FIG. 3B, the first side 306 and the second side 308 may be iteratively eroded until there are no valid segments in a successive iteration. The resulting set of subpaths determined (e.g., such as subpath 320) may then be connected based on any number of optimizations described herein including, but not limited to, those described above with respect to FIG. 2E, by connecting successively interior nodes of the subpaths (e.g., a start node and an end node) to form a spiral, or otherwise. Such connections (and subpaths) define a coverage plan.

Figure 4:
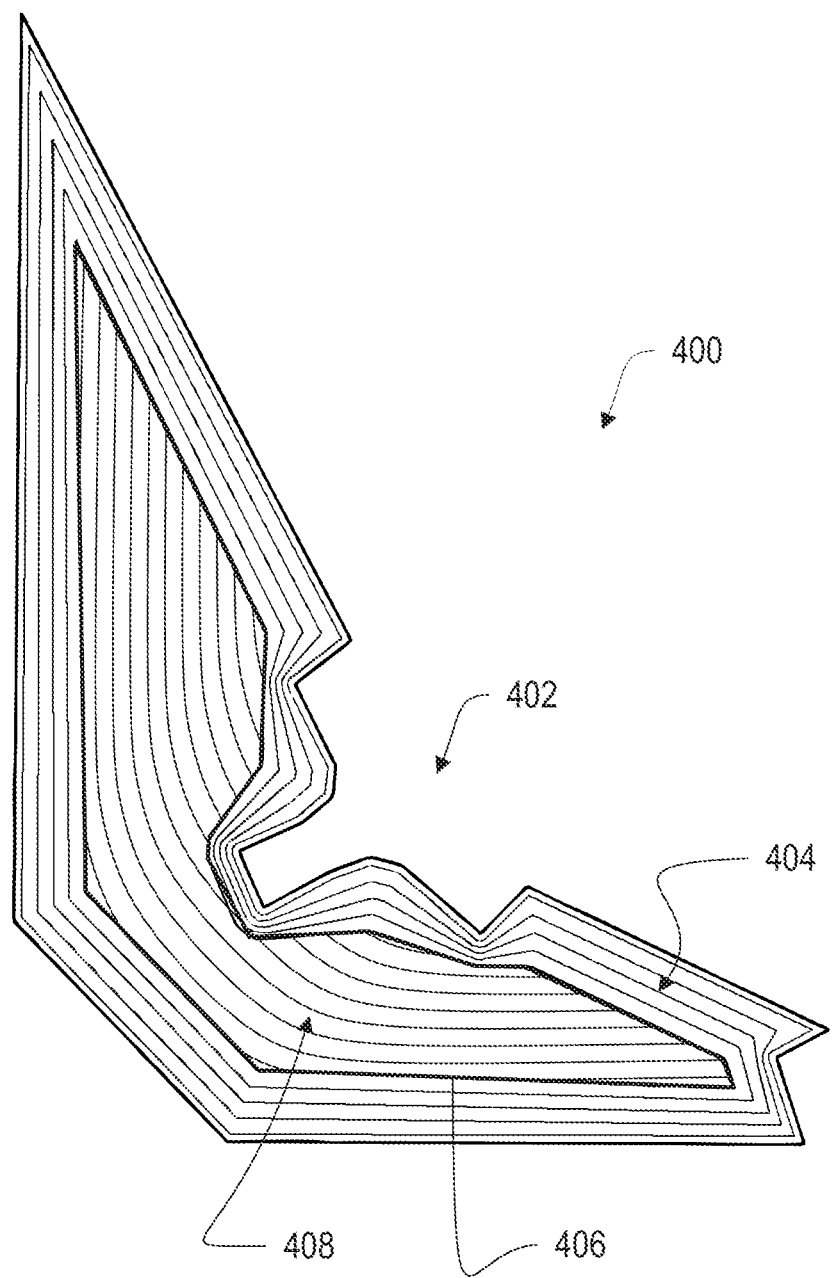
FIG. 4 illustrates an example coverage plan generated based at least in part on a combination of techniques illustrated in FIGS. 2 and 3.

FIG. 4 depicts yet another example of determining a coverage plan. As illustrated, polygon 400 may have one or more high frequency regions 402. Such high frequency regions 402 may comprise regions having any of complex shapes, areas of high concavity or convexity, short lengths, large changes in orientation of corresponding perimeter, or the like. In a first operation, the techniques described with respect to FIGS. 3A and 3B may be used to generate a number of subpaths 404. The subpaths 404 cover only a portion of the polygon 400 and leave a resultant interior polygon 406. The number of iterations used to generate the subpaths may be fixed (e.g., 1, 2, 3, 4, 5, etc.) and/or based at least in part on the resultant interior polygon 406 (e.g., iterated until the resultant interior polygon has no high frequency regions and/or less than or equal to some threshold ratio, percentage, or amount of high frequency regions).

The resultant interior polygon 406 may then be used as a basis to determine one or more additional subpaths 408 using the techniques described with respect to FIGS. 2A-2E. Subpaths 404 and 408 may be used in independent optimizations (e.g., creating a partial coverage plan associated with each set of subpaths) and/or used in a single optimization to create an overall coverage plan. Regardless, the final output may comprise a coverage plan. The coverage plan may comprise patterns that reduce or remove challenges for covering regions with high frequency contours, while preserving the aesthetics of following the major line (e.g., longest optimized path of the polygon) as well as minimizing an amount of time to cover the entirety of polygon 400.

Figure 5:
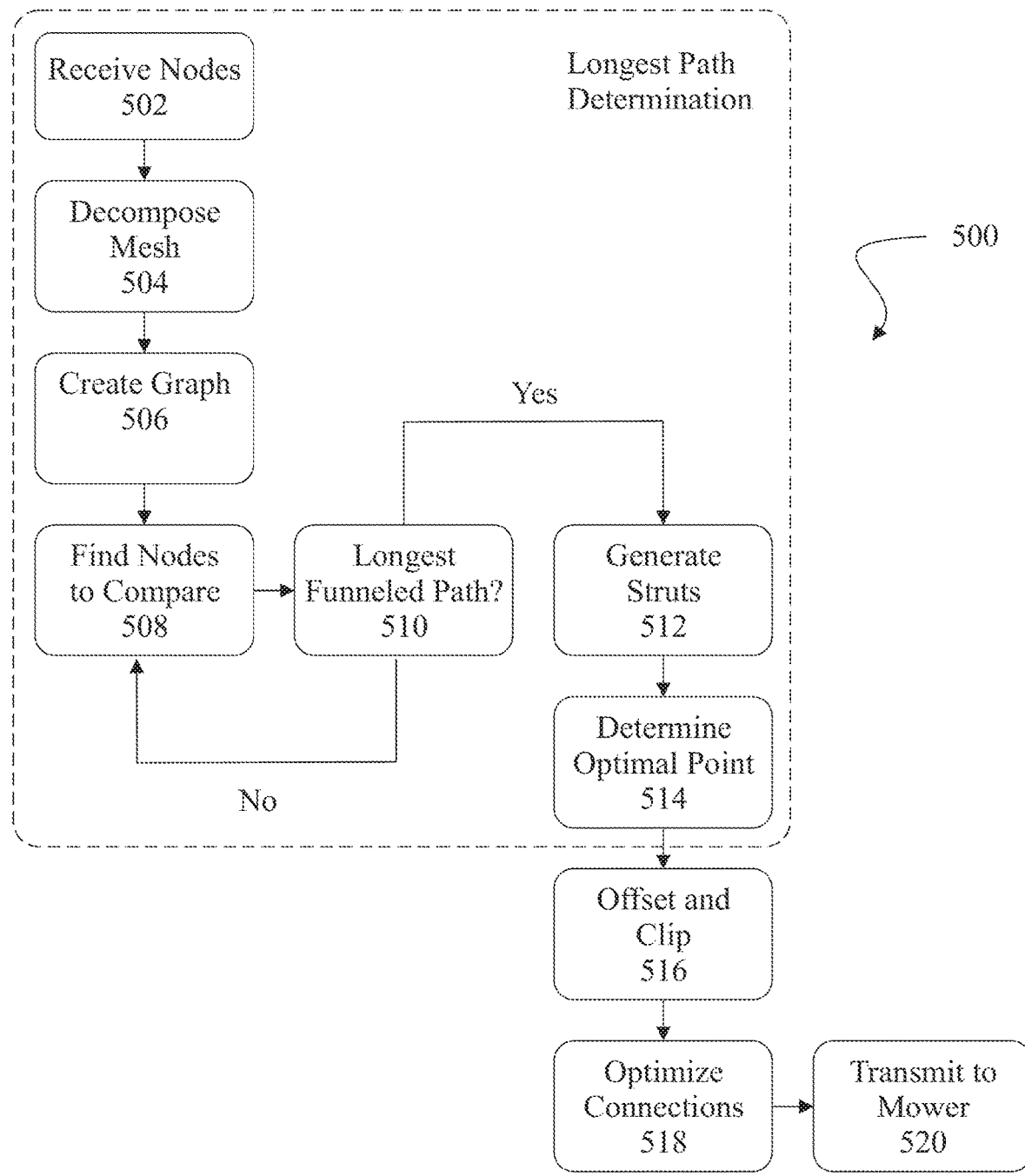
FIG. 5 is an example flow diagram for generating a coverage plan for an area.
Figure 6:
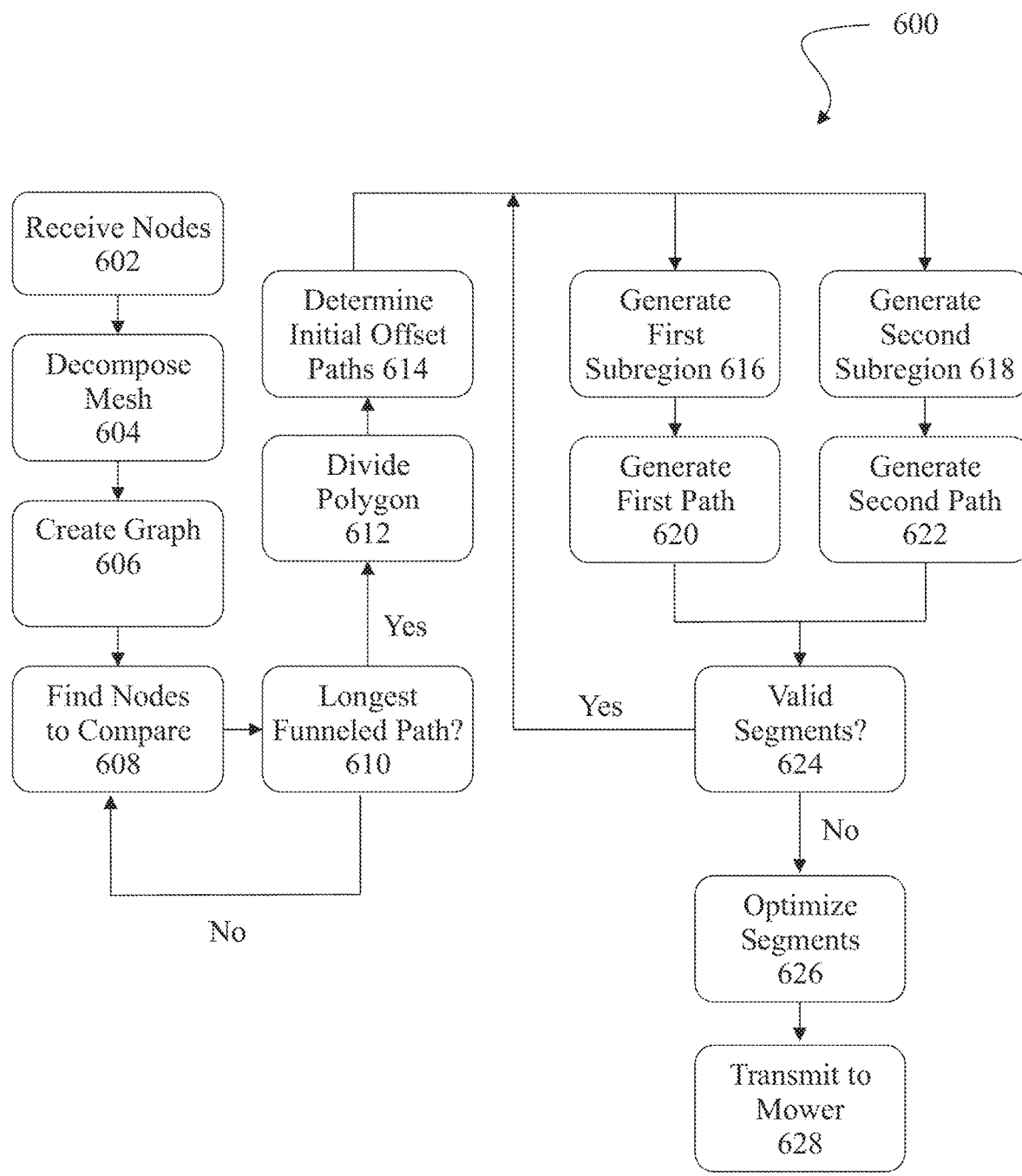
FIG. 6 is another example flow diagram for generating a coverage plan for an area.
Figure 7:
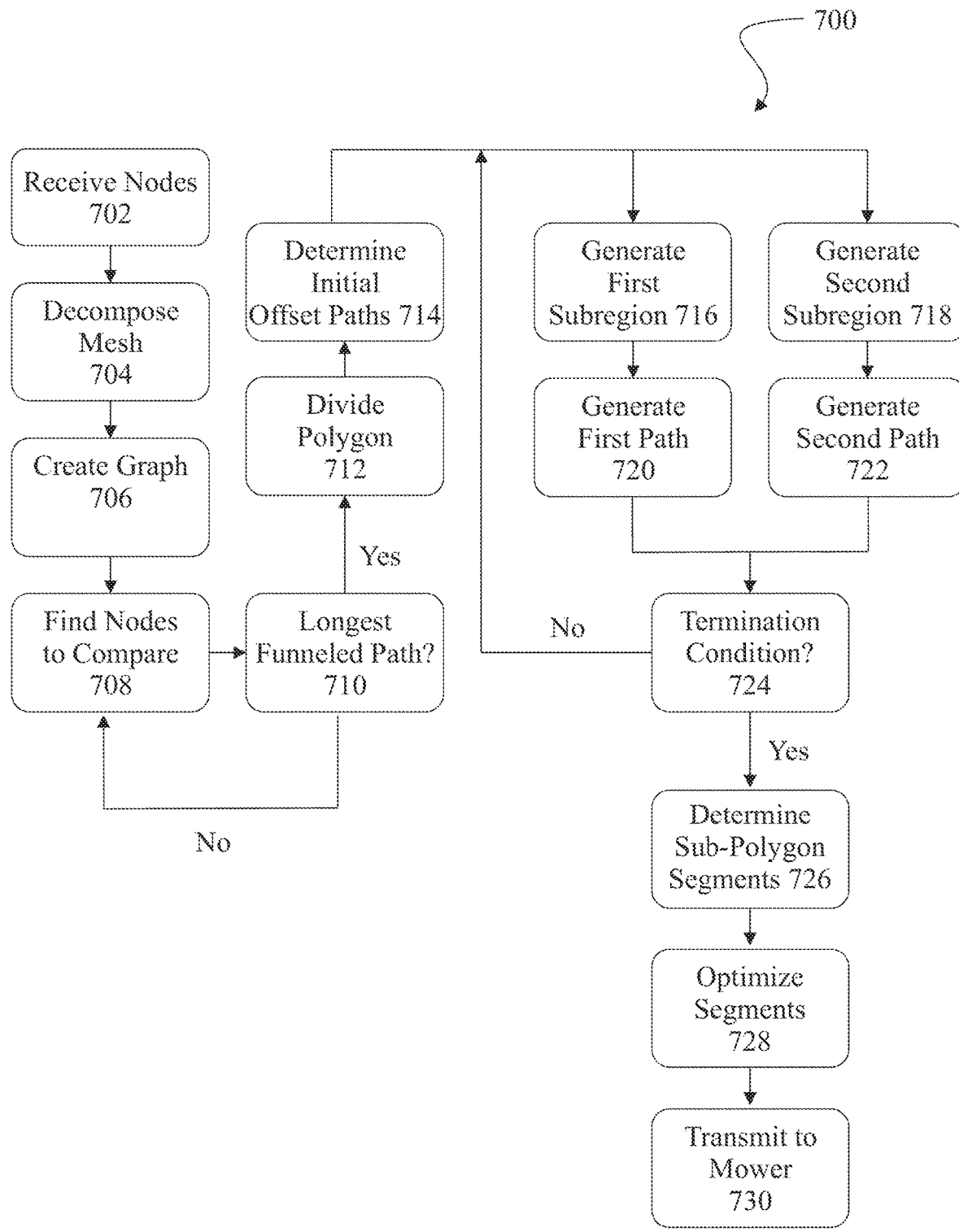
FIG. 7 is yet another example flow diagram for generating a coverage plan for an area.

FIGS. 5-7 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein. Further, in those systems with more than one blade, the following operations depicted in any of the flow charts herein may be performed based on any one or more blades.

FIG. 5 illustrates an example flow 500 for determining a coverage plan for a given area. At operation 502, one or more nodes are received. The one or more nodes are indicative of a boundary or perimeter of a polygonal area. The nodes may represent GPS locations, coordinates in a given reference frame, or the like. As described in detail above, the nodes may be determined based at least in part on one or more of input from a user via a graphical user interface (GUI) (such as when looking at a satellite view in a browser via the internet), collected by a user holding a mobile device and walking an area with the nodes representing evenly spaces geospatial references and/or upon input from a user, from a device (such as a lawn mower, whether autonomous, semi-autonomous, or manually operated) having positioning or localization capabilities, or otherwise.

The nodes received at 502 are then used in operation 504 to decompose the polygon into a mesh. Such a mesh may comprise any number of simple and/or convex shapes. In at least some examples, such a decomposition may comprise an earcut algorithm to decompose the polygon into a triangle mesh. Of course, as described in detail above, any other decomposition algorithm is contemplated.

At operation 506, a graph is generated based at least in part on the mesh determined in 504. The nodes in the graph may comprise, for example, one or more of a centroid, center of mass, center, or otherwise for the sub-meshes (e.g., triangles). The graph may then be constructed based at least in part on nearest neighbors, adjacent sub-meshes, or otherwise.

At operation 508, pairs of nodes (e.g., those nodes provided in 502) may be determined based at least in part on the graph. In some examples, Djikstra's algorithm, or otherwise, may be used to find the longest distance between nodes of the graph (e.g., triangle centers). In at least some such examples, a first node may be selected from a sub-mesh associated with one end of the graph and a second node may be selected from a second sub-mesh associated with the other end of the graph.

At operation 510, a funneled path may then be determined based on the first and second nodes determined in 508. Such a funneled path may comprise, for example, the shortest connection between the two nodes without going outside of the boundaries of the polygon. Of course, in other examples, the path may simply be the shortest distance between the points, regardless of being inside the polygon. The funneled path is compared to a previously determined funneled path, if any. If longer than the previous, it is selected as the longest. Otherwise, the previous is selected as the longest. In at least some examples, if not all combinations of nodes have been compared (e.g., the plurality of combinations of nodes of the first and second sub-meshes), flow may return to 508. Otherwise, flow proceeds to 512.

At 512, a plurality of struts is determined associated with segments of the longest funneled path. The struts are spaced based at least in part on a user defined parameter (e.g., a desired spacing between struts) and normal to the longest flow path. The struts are clipped by the perimeter of the polygon. As described herein, additional struts may be determined based on an interpolation between regions to ensure uniformity distribution between orientations of one segment to the next.

At 514, an optimization is performed with respect to the plurality of struts to determine an optimal point along the strut. Such an optimization may comprise, for example, determination of one or more costs. Such costs may comprise, for example, a cost which penalizes high curvature, a cost which penalizes deviation from a center of a strut, a cost which penalizes a distance from a perimeter of the polygon, as well as any other cost. In at least some examples, one or more additional smoothing operations may be performed to ensure that the longest path is smooth throughout and/or based at least in part on capabilities and/or parameters of the system (e.g., a turning radius, width, etc.).

For ease of illustration in later figures, the set of operations defined by 502 through 514 may be referenced as a Longest Path Determination.

At operation 516, the optimal points are connected to determine a longest path. The longest path is then offset in either direction a number of times to cover the entirety of the polygon. Such offsets may be based on, for example, a width of the device to cover the area, a desired overlap between passes, and the like. The plurality of offsets are then clipped by the perimeter of the polygon to determine a plurality of subpaths.

At operation 518, the plurality of subpaths are connected to form a coverage plan. Such connections may be naively connected by simply connecting a starting point of the node to an end point of a proximate subpath. In additional or alternate examples, an optimization may be performed to connect the subpaths. The optimization may be based at least in part on one or more of minimizing a time to traverse all paths, an energy required to pass all paths, and the like. In some such examples, an ant-colony method may be used for such an optimization. In various examples, such an optimization may further comprise optimizing based at least in part on one or more of a user-provided start point or a user-provided end point (e.g., GPS location, endpoint, waypoint, etc.).

At operation 520, the final coverage plan (e.g., subpaths and all connections therebetween) may be transmitted to a mower, system, subsystem, or otherwise. Such a mower or system may be configured to receive the coverage plan and generate one or more controls for controlling the system to traverse the area bounded by the polygon according to the coverage plan.

FIG. 6 illustrates an example flow 600 for determining a coverage plan for a given area. At operation 602, one or more nodes are received. Similar to FIG. 5, the one or more nodes are indicative of a boundary or perimeter of a polygonal area. The nodes may represent GPS locations, coordinates in a given reference frame, or the like. As described in detail above, the nodes may be determined based at least in part on one or more of input from a user via a graphical user interface (GUI) (such as when looking at a satellite view in a browser via the internet), collected by a user holding a mobile device and walking an area with the nodes representing evenly spaces geospatial references and/or upon input from a user, from a device (such as a lawn mower, whether autonomous, semi-autonomous, or manually operated) having positioning or localization capabilities, or otherwise.

The nodes received at 602 are then used in operation 604 to decompose the polygon into a mesh. Such a mesh may comprise any number of simple and/or convex shapes. In at least some examples, such a decomposition may comprise an earcut algorithm to decompose the polygon into a triangle mesh. Of course, as described in detail above, any other decomposition algorithm is contemplated.

At operation 606, a graph is generated based at least in part on the mesh determined in 604. The nodes in the graph may comprise, for example, one or more of a centroid, center of mass, center, or otherwise for the sub-meshes (e.g., triangles). The graph may then be constructed based at least in part on nearest neighbors, adjacent sub-meshes, or otherwise.

At operation 608, pairs of nodes (e.g., those nodes provided in 602) may be determined based at least in part on the graph. In some examples, Djikstra's algorithm, or otherwise, may be used to find the longest distance between nodes of the graph (e.g., triangle centers). In at least some such examples, a first node may be selected from a sub-mesh associated with one end of the graph and a second node may be selected from a second sub-mesh associated with the other end of the graph.

At operation 610, a funneled path may then be determined based on the first and second nodes determined in 608. Such a funneled path may comprise, for example, the shortest connection between the two nodes without going outside of the boundaries of the polygon. The funneled path is compared to a previously determined funneled path, if any. If longer than the previous, it is selected as the longest. Otherwise, the previous is selected as the longest. In at least some examples, if not all combinations of nodes have been compared (e.g., the plurality of combinations of nodes of the first and second sub-meshes), flow may return to 608. Otherwise, flow proceeds to 612.

At 612, the polygon may be divided into two based at least in part on the longest funneled path. Nodes (and/or connections therebetween) associated with one half may form a first side and nodes (and/or connections therebetween) associated with the other half may form a second side.

At 614, initial offset paths may be determined based at least in path on the first side and/or the second side. An initial path may be determined such that it is offset a given amount from the first side. Similarly, a second initial path may be determined to be offset a given amount from the second side. In either case, such an offset may be, for example, based at least in part on a physical parameter of the system to traverse the coverage plan. For instance, the initial offset paths may be determined so as to be a half a width of a mower away from each side.

At 616, a first region is determined based on the path provided. In a first iteration, such a first region is determined based on the first initial path. In subsequent iterations, the region is determined based on the previously determined path. Regardless, a minimum offset and a maximum offset are determined along the entirety of the path provided. Such offsets may be determined, based at least in part on one or more of a physical parameter of the system (e.g., a width of a lawn mower), user specified, based at least in part on a desired overlap between passes when traversing a resultant coverage plan, or the like. In at least some examples, the locations of such minimum and maximum offsets are determined so as to reduce a remaining area of the polygon to cover (e.g., moving inward). A resulting region bounded by the minimum and maximum offsets comprises the first region.

At 618, a similar process may be used to determine the second region (e.g., by determining a minimum and maximum offset from the second path provided).

At 620, a longest path is determined which runs through the first region. Details of the operations to determine, as the first path, the longest path are provided with respect to the operations bounded by the dashed box of FIG. 5. At 622, a similar operation may be performed to determine, as the second path, the longest path associated with the second region.

At 624, portions (or segments) of the first and second paths may be determined which are valid. In at least some examples, validity may comprise, for examples, determining those portions of the first path which are closer (e.g., in Euclidian distance) to the first side than the corresponding portions of the second path and/or those portions of the second path which are closer (e.g., in Euclidian distance) to the second side than the corresponding portions of the first path. In some examples, determining validity may comprise determining one or more intersection points between the paths and finding those regions between intersections (or endpoints) in which one path crosses into the region (or side) of the other path (which, in some examples, may comprise regions having a negative sign). In various examples, such correspondence may be based at least in part on a number of iterations (e.g., such that paths are compared that are of the same number of iterations). If any segment of the first or second path are valid, flow proceeds to 616 and/or 618 where such portions are used as first and/or second path for subsequent iterations. In some examples, the entire first and second paths are used in subsequent erosions. In general, such a process of finding iterative segments (e.g., any or all of operations 602 through 622) may be referred to as "eroding" a side or polygon.

In at least some examples, if no valid segments (or portions) of either the first or second path exist, flow may proceed to 626 where all such previously determined segments (including the initial path(s)) are combined to form a coverage plan. In at least some examples, such segments may be combined to form a spiral and/or concentric circular paths wherein an outer endpoint is connected to an subsequent inner concentric path. In other examples, of course, the one or more segments may be connected via an optimization which, for example, minimized a time to traverse an area, an amount of energy used to traverse the area, or otherwise. In various examples, such an optimization may further comprise optimizing based at least in part on one or more of a user-provided start point or a user-provided end point (e.g., GPS location, endpoint, waypoint, etc.).

At 628, the resultant coverage plan is transmitted to a system (such as a mower). Such a system is configured to receive the coverage plan and traverse the given area based at least in part on the coverage plan (e.g., by controlling one or more actuators).

Though operations 616 and 620 are depicted as occurring substantially simultaneously (e.g., within technical tolerances) of operations 618 and 622, the description is not meant to be so limiting. As detailed above, any operation may be performed in any order (whether in series, in parallel, with one or more steps omitted, or in any other order).

FIG. 7 illustrates an example flow 700 for determining a coverage plan for a given area. The flow depicted in FIG. 7 represents a combination of techniques described with respect to FIGS. 5 and 6 for generating a coverage plan. As described in detail above, such a combination may be particularly useful for determining coverage plans for polygons having high frequency regions. At operation 702, one or more nodes are received. Similar to FIGS. 5 and 6, the one or more nodes are indicative of a boundary or perimeter of a polygonal area. The nodes may represent GPS locations, coordinates in a given reference frame, or the like. As described in detail above, the nodes may be determined based at least in part on one or more of input from a user via a graphical user interface (GUI) (such as when looking at a satellite view in a browser via the internet), collected by a user holding a mobile device and walking an area with the nodes representing evenly spaces geospatial references and/ or upon input from a user, from a device (such as a lawn mower, whether autonomous, semi-autonomous, or manually operated) having positioning or localization capabilities, or otherwise.

The nodes received at 702 are then used in operation 704 to decompose the polygon into a mesh. Such a mesh may comprise any number of simple and/or convex shapes. In at least some examples, such a decomposition may comprise an earcut algorithm to decompose the polygon into a triangle mesh. Of course, as described in detail above, any other decomposition algorithm is contemplated.

At operation 706, a graph is generated based at least in part on the mesh determined in 704. The nodes in the graph may comprise, for example, one or more of a centroid of area, centroid of nodes, center of mass, center, or otherwise for the sub-meshes (e.g., triangles). The graph may then be constructed based at least in part on nearest neighbors, adjacent sub-meshes, or otherwise.

At operation 708, pairs of nodes (e.g., those nodes provided in 702) may be determined based at least in part on the graph. In some examples, Djikstra's algorithm, or otherwise, may be used to find the longest distance between nodes of the graph (e.g., triangle centers). In at least some such examples, a first node may be selected from a sub-mesh associated with one end of the graph and a second node may be selected from a second sub-mesh associated with the other end of the graph.

At operation 710, a funneled path may then be determined based on the first and second nodes determined in 708. Such a funneled path may comprise, for example, the shortest connection between the two nodes without going outside of the boundaries of the polygon. The funneled path is compared to a previously determined funneled path, if any. If longer than the previous, it is selected as the longest.

Otherwise, the previous is selected as the longest. In at least some examples, if not all combinations of nodes have been compared (e.g., the plurality of combinations of nodes of the first and second sub-meshes), flow may return to 708. Otherwise, flow proceeds to 712.

At 712, the polygon may be divided into two based at least in part on the longest funneled path. Nodes (and/or connections therebetween) associated with one half may form a first side and nodes (and/or connections therebetween) associated with the other half may form a second side.

At 714, initial offset paths may be determined based at least in path on the first side and/or the second side. An initial path may be determined such that it is offset a given amount from the first side. Similarly, a second initial path may be determined to be offset a given amount from the second side. In either case, such an offset may be, for example, based at least in part on a physical parameter of the system to traverse the coverage plan. For instance, the initial offset paths may be determined so as to be a half a width of a mower away from each side.

At 716, a first region is determined based on the path provided. In a first iteration, such a first region is determined based on the first initial path. In subsequent iterations, the region is determined based on the previously determined path. Regardless, a minimum offset and a maximum offset are determined along the entirety of the path provided. Such offsets may be determined, based at least in part on one or more of a physical parameter of the system (e.g., a width of a lawn mower), user specified, based at least in part on a desired overlap between passes when traversing a resultant coverage plan, or the like. In at least some examples, the locations of such minimum and maximum offsets are determined so as to reduce a remaining area of the polygon to cover (e.g., moving inward). A resulting region bounded by the minimum and maximum offsets comprises the first region.

At 718, a similar process may be used to determine the second region (e.g., by determining a minimum and maximum offset from the second path provided).

At 720, a longest path is determined which runs through the first region. Details of the operations to determine, as the first path, the longest path are provided with respect to the operations bounded by the dashed box of FIG. 5. At 722, a similar operation may be performed to determine, as the second path, the longest path associated with the second region.

At 724, a determination is made as to whether one or more termination conditions are satisfied. In some examples, the termination condition may be based at least in part on whether a number of iterations (or erosions of the two sides of the polygon) have been performed (e.g., 2, 3, 4, 5, or more). In some examples, the termination condition may be based on additional or alternate parameters associated with the region to be covered. In some such examples, a remaining area of the region (e.g., that portion of the polygon without associated segments determined in the previous steps) may define a subpolygon. In those examples, such a termination condition may be based at least in part on one or more of a threshold amount of high frequency regions (including whether any high frequency regions of the subpolygon exist), a threshold percentage of area between the subpolygon and the polygon, or any other parameter.

If the termination condition is not satisfied, flow may return to 716 and 718 to generate additional eroded segments. Otherwise, flow proceeds to 726.

At 726, additional segments are determined for a subpolygon defined by the portion of the polygon without associated segments determined in the previous steps (which, in at least some examples, may include an offset such as, but not limited to, half a width of the system traversing the region). Such additional segments may be determined in accordance with FIG. 5 (e.g., operations 502 through 516). In particular, the subpolygon may be defined by a series of nodes. Such nodes may be used as the basis for determining a second sub-mesh, generating a graph, finding the longest funneled path, determining the longest path, generating offset paths and clipping such paths by the boundary of the subpolygon (as the additional segments).

At 728 all segments (e.g., those determined in operations 714 through 726) are connected. In at least some examples, such segments may be combined to form a spiral and/or concentric circular paths wherein an outer endpoint is connected to an subsequent inner concentric path. In some examples, the first set of segments (e.g., those determined by erosion) may be connected in such a manner, whereas those segments associated with the subpath may be connected such that an endpoint of one segment is connected to the nearest remaining segment endpoint without leaving the polygon or subpolygon. In other examples, of course, the one or more segments may be connected via one or more optimizations which, for example, minimized a time to traverse an area, an amount of energy used to traverse the area, or otherwise. In at least some example, a first optimization may be used for those segments determined via erosions, a second optimization may be used to connect the segments associated with the subpolygon, and/or a third optimization may be used to determine the connections therebetween. In various examples, such an optimization may further comprise optimizing based at least in part on one or more of a user-provided start point or a user-provided end point (e.g., GPS location, endpoint, waypoint, etc.).

At 730, the resultant coverage plan is transmitted to a system (such as a mower). Such a system is configured to receive the coverage plan and traverse the given area based at least in part on the coverage plan (e.g., by controlling one or more actuators).

Though operations 716 and 720 are depicted as occurring substantially simultaneously (e.g., within technical tolerances) with operations 718 and 722, the description is not meant to be so limiting. As detailed above, any operation may be performed in any order (whether in series, in parallel, with one or more steps omitted, or in any other order).

Example System

Figure 8:
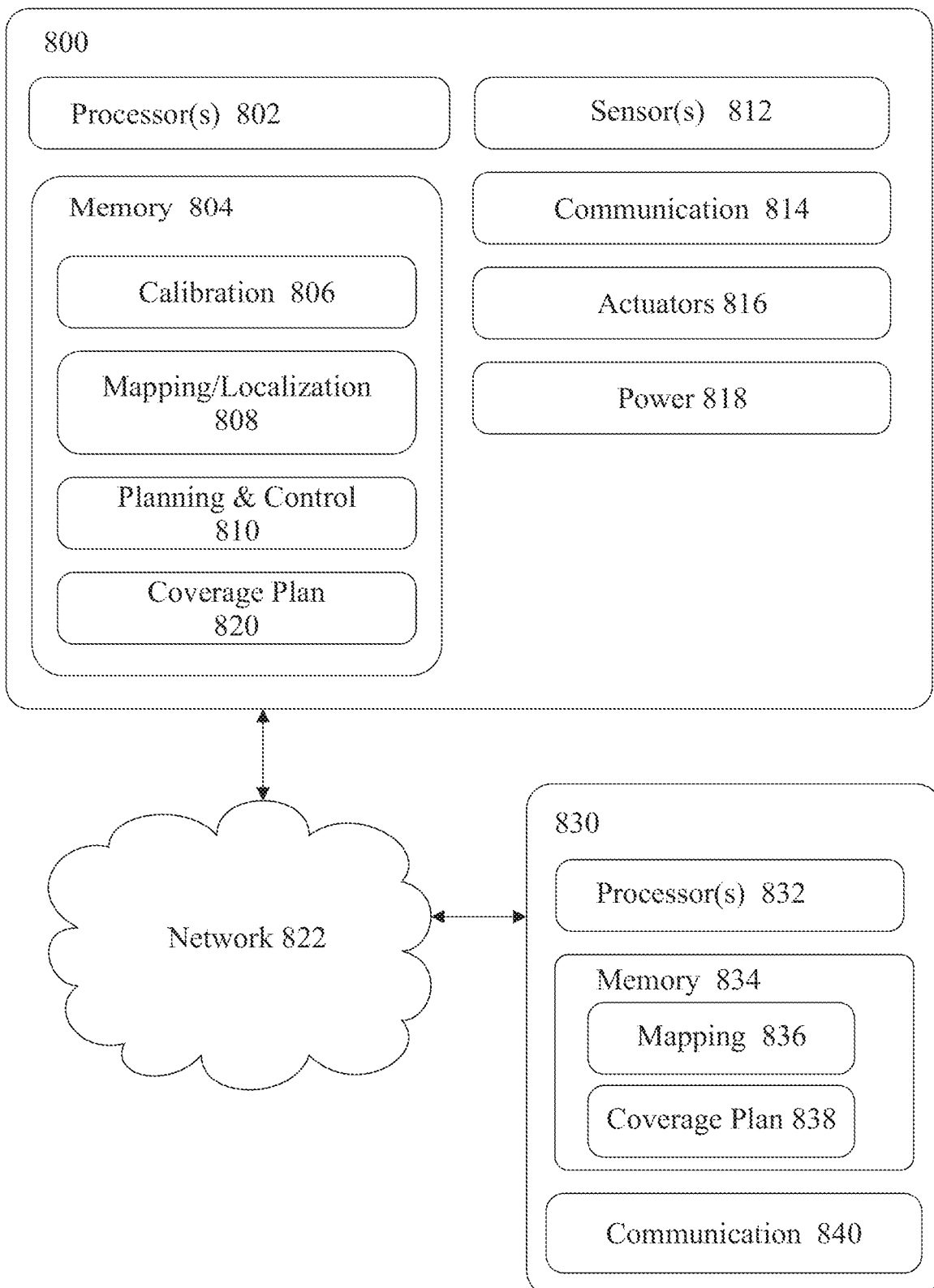
FIG. 8 depicts an example system for determining a coverage plan as described herein.

FIG. 8 is an example system 800 capable of performing the operations described herein. Such a system 800 may comprise one or more of processors 802, memory 804, sensor(s) 812, communication subsystem 814, actuators 816, and power system 818. Further, though depicted in FIG. 8 as a single system 800 for illustrative purposes, the intention is not to be so limiting. For example, the system 800 may be a distributed system (either locally or non-locally), where each block may be present on (or performed by) a remote system. Further, though particular blocks are associated with individual systems or subsystems, the disclosure is not meant to be so limiting. Indeed, any block may be present in any one or more of the systems or subsystems illustrated in FIG. 8 (or not present at all).

The system 800 may include one or more processor(s) 802, any of which capable of performing the operations described herein. In some examples, the processor(s) 802 may be located remotely from the system 800. The one or more processor(s) 802 may comprise one or more central processing units (CPUs), one or more graphics processing units (GPUs), digital signal processors (DSPs), field programmable gate arrays (FPGAs), application specific integrated circuits (ASICs), or the like. In one example, the system 800 may include a model Jetson Xavier computing module available from Nvidia Corporation.

Memory 804 is an example of one or more non-transitory computer readable media capable of storing instructions which, when executed by any of the one or more processor(s) 802, cause the one or more processor(s) 802 to perform any one or more of the operations described herein (e.g., those described in reference to any of FIG. 1-7). The memory 804 can store an operating system and one or more software applications, instructions, programs, and/or data to implement the methods described herein and the functions attributed to the various systems. In various implementations, the memory 804 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 804 is capable of storing raw sensor data from the one or more sensor(s) 812, compressed or downsampled sensor data, output (or intermediate representations) of one or more machine learning models (e.g., feature maps of neural networks), and/or representations of the raw sensor data.

Sensor(s) 812 may comprise one or more image sensor(s), radar(s), lidar(s), ultrasonic(s), touch sensors, Global Positioning and/or Navigation Satellite Systems, inertial measurement units (IMUs)—which may comprise one or more accelerometers, gyroscopes, and/or magnetometers, and the like, encoders (which may be associated with any one or more wheels or one or more blades), orientation sensors, Hall sensors, ammeters, voltmeters, power meters, location systems, battery management systems, motor sensors, etc. Image sensors may comprise, for example, RGB cameras, intensity cameras (e.g., greyscale or monochrome), stereo cameras, depth cameras (e.g., structured light sensors, time of flight (TOF) cameras, etc.), RGB-D cameras, infrared cameras, ultraviolet cameras, hyperspectral cameras, and the like. In those examples where multiple image sensors are contemplated, various image sensors may have varying fields of view. For example, where at least two image sensors are used, one image sensor may be a narrow field of view camera and the other a wide-angle field of view camera.

Sensor(s) 812 may further include, for example, ultrasonic transducers (e.g., SONAR), thermal imaging sensors (e.g., infrared imagers), non-contact temperature sensors (e.g., sensors capable of determining the temperature of a surface), ambient light sensors (e.g., light sensors such as, but not limited to, photodiodes capable of determining an intensity of light at 600-1200 nm), humidity sensors, pressure sensors, bolometers, pyrometers, wind speed sensors, and the like. Sensor data from such other sensors may be used to generate the three-dimensional maps and/or localize the system 800, such as in mapping/localization component 808. Any of the one or more sensor(s) 812 may also be associated with a timestamp including, but not limited to, a time of day, time of month, and/or time of year (e.g., Jan. 16, 2018 4:50 am UTC).

Sensors(s) 812 may also comprise a deck sensor comprising at least one sensor for determining a height of the blades relative to the grass and/or the chassis (e.g., a Hall effect sensor), and/or at least one sensor for measuring blade rotation parameters such as RPM, velocity, torque sensor or the like.

Such an example system 800 as shown in FIG. 8 may additionally or alternatively comprise one or more communication subsystems 814. An example communication subsystem 814 may be used to send and receive data either over a wired or wireless communication protocol, as well as provide data connectivity between any one or more of the processor(s) 802, memory 804, and sensors 812. Such protocols may include, but are not limited to, WiFi (802.11), Bluetooth, Zigbee, Universal Serial Bus (USB), Ethernet, TCP/IP, serial communication, cellular transmission (e.g., 4G, 5G, CDMA, etc.) and the like. As indicated herein, such a communication subsystem 814 may be used to send data (e.g., sensor data, control signals, etc.) to other systems (e.g. cloud-based computers, etc.). In at least some examples, to minimize an amount of data transferred (as raw sensor data may amount to upwards of multiple gigabytes to multiple terabytes per day), raw sensor data from the one or more sensors 812 may be downsampled or compressed before transmission. In at least one example, sensor data (whether raw, compressed, downsampled, a representation thereof, or otherwise) may be automatically uploaded to another computing device when in a particular location (e.g., when in a shed, or other preselected user location). Representations of data may include, for example, averages of the data, feature maps as output from one or more neural networks, extracted features of the data, bounding boxes, segmented data, and the like.

The system 800 may comprise actuator(s) 816, such as, but not limited to, one or more motors to provide torque to one or more wheels associated with the system 800, a deck actuator to raise and lower a blade platform or deck (though any other actuator is contemplated), one or more motors to spin associated one or more blades for cutting, one or more brakes associated with the one or more wheels, and the like. Such actuators may further comprise, for example, electric and/or mechanical motors, hydraulics, pneumatics, and the like. Upon receiving a signal from one or more of the planning and control subsystem 810, at least a portion of the actuator(s) may actuate in order to effectuate a trajectory (steering, acceleration, etc.), release fertilizer, seed, herbicide, pesticide, insecticide, seed, etc., and the like.

In one example, the drive motors may be one or more brushless DC motors, permanent magnet AC motors, AC induction motors, switched reluctance motors or the like. In one specific example, the motors may be a brushless DC motor, part number 53316, available from HydroGear driven by a motor controller, part number 53283, available from HydroGear. The motor controller circuits (power switching) may be separate from the motors or built into the motors. In one example, the motor controllers may operate on the Field Oriented Control (FOC) principle, a technique that allows a brushless motor to operate at very high efficiency. The motor controllers may use a three-phase half-H inverter design utilizing N-channel MOSFETs (e.g., SiC FETs or IGBTs). The motor controllers 245 may utilize rotor feedback to facilitate accurate FOC motor control via encoders (e.g., inductive, optical, magnetic, or conductive), resolvers, Hall effect sensors, or "sensorless" through back EMF measurements from the motors themselves.

The actuator(s) for spinning the blades may be, for example, a brushless DC motor rotating the blades at, for example, about 1000 RPM up to about 5000 RPM when operating nominally. The deck actuator may comprise one or more linear actuator such as solenoid(s), ball screw(s), rack and pinion assembly(ies), hydraulic/pneumatic piston, or the like.

The actuator(s) 816 may further comprise a brake system. Such a brake system may be electronically controlled to perform braking and/or a brake assembly may be coupled to each motor to slow the rotation of each wheel independent, when braking is used to steer the mower, or slow rotation of both wheels simultaneously, when front wheel steering is used to steer the mower. In one example, the control subsystem 810 may use a friction-based braking system with friction pads (either disk, drum, or clutch style brakes) that are coupled to a motor shaft, either before or after a transmission or other gearing that may form part of each motor. The braking system may be electromagnetically actuated via a solenoid, linear actuator or other electric-motor driven mechanism. Using such a braking system enables the mower to be held at zero velocity when the mower is not being commanded to move. In addition, a friction based braking system saves power and prevents runaway mowers in the event of emergency stops or system failure. In addition to, or in lieu of, the friction braking system, the control subsystem 810 may utilize regenerative braking through control of the drive motors. In one example, regenerative braking is used for non-emergency braking during normal operation and friction braking is used during emergency stops and parking. With regenerative braking, energy from mower inertia is either transferred into the battery(ies) and/or into a brake resistor.

System 800 may also comprise a power system 818 including, but not limited to one or more of batteries, battery packs, fuel cells, super capacitors, or otherwise to provide power to the one or more processor(s) 802, actuators 816, sensor(s) 812, or any other component or subcomponent of the system 800 which requires power. The power system 818 may be removable such that the power system 818 can be removed and replaced when not operating within norms, e.g., recharge capacity is below a capacity threshold. The power system 818 may include multiple energy sources such as a battery or fuel cell for powering the mower electronics and a tank for gasoline, natural gas, hydrogen, or other fuel for powering one or more motors.

Though not illustrated for clarity, the system 800 may comprise one or more support circuits which may comprise circuits and devices that support the functionality of the processor(s) 802. The support circuits may comprise, one or more or any combination of: clock circuits, communications circuits, cache memory, power supplies, interface circuits for the various sensors, actuators, and communications circuits, and the like. More specifically, the support circuits may comprise sensor interfaces, communication circuit(s) interfaces, and actuator drive interfaces. The sensor interfaces may support data transfer from the sensor(s) 812 to the processor(s) 802 through one or more, or any combination of, data buffering/caching, signal digitizing, signal amplification, digital and/or analog signal processing, filtering, limiting, and/or the like.

The communication circuits interfaces may support data transfer to/from the communications circuits (e.g., LTE and/or WiFi transceivers) to/from the processor(s) 802 through one or more, or any combination of, digital and/or analog signal processing, filtering, limiting, amplifying, and/or the like. The communications circuits may comprise one or more communications transceivers (modems) and their associated antennas. In some examples, the communication circuits may include, but are not limited to, a pair of WiFi transceivers, a pair of LTE transceivers, or the like. The antennas generally may include a plurality of antennas to ensure diverse antenna positioning on the mower body to combat multi-path interference. A pair of transceivers may be used to provide redundancy. For example, two antennas for each transceiver (eight antennas total) are mounted on either side of the body (see FIGS. 1A and 1B). The antennas for LTE/WiFi and GNSS may be collocated in a single antenna housing (dome). One such example of such an antenna is the Combo Outdoor IP67 Roof Antenna available from Teltonika.

The actuator drive interfaces may support control of the actuators 816 (e.g., drive motors, brake system, blade motors, deck actuator, etc.) through one or more, or any combination of, current, voltage or pulse width modulated signal controllers in the form of motor controllers, brake controllers, solenoid controllers and/or the like.

Within memory 804, a calibration component 806 may perform calibration of the one or more sensor(s) 812 and/or actuators 816. Calibration may comprise determining one or more sensor intrinsics and/or extrinsics, as well as determining positions of components or subcomponents (e.g., blade height), applied torques relative to currents applied, and the like. Such calibration protocols performed by calibration component 806 may ensure that any one or more components or subcomponents of system 800 is working properly and enable correct calculations to be generated given the system's 800 current understanding of the relative positions, orientations, and parameters of the other components and subcomponents.

A mapping/localization component 808 may take in sensor data from any one or more of the sensor(s) 812, in addition to any one or more outputs from the calibration component 806 to one or more of map an area and/or provide a position and/or orientation of the system 800 relative to the map. In at least one example, sensor data from the one or more sensor(s) 812 may be used to construct (and/or update) a two- and/or three-dimensional map of the scanned area. When updating, preexisting map data may be received from memory 804 and/or from server 830. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g., pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors may be used to reconstruct depth of the environment and provide additional features for use in generating the map and or localizing the system 800 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by system 800) may be associated with the map at mapping and localization component 808. In some examples, GNSS data may be used to inform a Region of Interest (ROI) of satellite imagery to download to, or otherwise augment, the two- or three-dimensional map. Additionally, or alternatively, such a system 800 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc. may be associated with every location in the three-dimensional map. Additionally, or alternatively, image sensor data (e.g., color) may be associated with the map as well (e.g., by weighted averaging, or the like), so that a user viewing the map would quickly see a virtual representation of the scanned area, including color.

The planning and control subsystem 810 may determine commands for operating one or more of the actuator(s) 816. In some examples, such a planning and control subsystem 810 may determine one or more trajectories for the system 800 to follow (e.g., by determining a series of steering commands, acceleration commands, etc. which cause the system 800 to follow an intended pattern). Such trajectories may be determined in accordance with waypoints (e.g., GNSS-based waypoints) as may be received from a user via control interface (not shown) and/or calculated to optimize (e.g., minimize) a length of travel over a defined region of interest (e.g., as may be determined by server 830), a quality of cut, or a time to mow an area, for example. Such calculations may be determined, for example, using Bellman Ford's algorithm, Dijkstra's Algorithm, or otherwise. In various examples, one or more of the waypoints and/or trajectories may be based at least in part on a coverage plan received from one or more of coverage planner 820 or coverage planner 838.

The planning and control subsystem 810 may comprise a blade speed/height control component (not illustrated). The blade speed/height control component receives sensor data indicative of, or used to determine, any one or more of blade speed, blade height, forward motion of the system 800, current associated with a motor coupled to the blade, or a torque used to spin the blade and, based at least in part on such sensor data, map data, historical sensor data, or otherwise as described herein, performs a calibration of the blade speed and/or height and/or generates control signals for actuating one or more of the blade (via the associated blade controller) or the forward motion of the system 800.

In any such example provided herein, such trajectories and/or controls may be calculated iteratively (and/or periodically) such that the system 800 (and/or associated user (s)) always has the most relevant information.

Example Clauses

A. A system configured to generate a coverage plan, the system comprising: one or more processors; and one or more non-transitory computer readable media having instructions stored thereon which, when executed by the one or more processors, cause the one or more processors to perform operations comprising: receiving a plurality of nodes indicative of a perimeter of a region to be mowed; determining, based at least in part on the plurality of nodes, a plurality of triangles defining a triangle mesh; determining, based at least in part on the triangle mesh, a graph connecting the plurality of triangles; determining, based at least in part on the graph, a longest funneled path between pairs of nodes of the plurality of nodes, the longest funneled path comprising one or more straight portions and indicative of a longest distance between the pairs of nodes and being interior to the perimeter of the region; determining, based at least in part on the longest funneled path, a set of segments; determining, as the coverage plan and by performing an optimization, one or more connections between the set of segments and an order in which to traverse the set of segments and the one or more connections; and transmitting the coverage plan to an autonomous lawn mower configured to receive the coverage plan and control the autonomous lawn mower to traverse at least a portion of the coverage plan.

B. The system as described in clause A, wherein determining the set of segments comprises: determining a plurality of struts normal to the one or more straight portions of the longest funneled path; determining, based at least in part on a cost associated with a strut of the plurality of struts, an optimal point along the strut; determining, as a longest path, a path comprising the pair of nodes associated with the longest funneled path and the optimal point; generating at least one offset path from the longest path, the offset path being offset by one or more of a width of the autonomous lawn mower or an overlap amount; and determining, as the set of segments, the longest path and one or more portions of the offset path interior to the perimeter.

C. The system of described in any of clauses A or B, wherein the cost comprises one or more of: a cost based at least in part on a curvature of the longest path at the optimal point, a cost based at least in part on a distance of the optimal point from a center of the strut, or a cost based at least in part on a distance of the optimal point from a perimeter of the region, and wherein determining the optimal point comprises determining a point along the strut which minimizes the cost.

D. The system as described in any of clauses A through C, wherein determining the set of segments comprises eroding the perimeter and wherein eroding the perimeter comprises: determining, as a first side, a portion of the perimeter between the pair of nodes associated with the longest funneled path; determining, as a second side, a remaining portion of the perimeter between the pair of nodes opposing the first side; determining a first initial offset segment associated with the first side and a second initial offset segment associated with the second side, the first and second initial offset segments spaced at least a portion of a width of the autonomous lawn mower from the first and second sides, respectively; determining, based at least in part on a minimum and a maximum offset from the first initial offset, a first path; determining, based at least in part on a minimum and a maximum offset from the second initial offset, a second path; determining a first set of valid portions of the first path; and determining a second set of valid portions of the second path, wherein the set of segments comprises the first initial offset, the second initial offset, the first set of valid portions of the first path, and the second set of valid portions of the second path.

E. The system as described in any of clauses A through D, wherein eroding the perimeter further comprises performing an iteration comprising: determining, based at least in part on a minimum and maximum offset from a previously determined first set of valid portions, a first subsequent path; determining, based at least in part on a minimum and maximum offset from a previously determined second set of valid portions, a second subsequent path; and determining, based at least in part on the first subsequent path and the second subsequent path, a subsequent first set of valid portions and a subsequent second set of valid portions, wherein the set of segments further comprises the subsequent first set of valid portions of the first subsequent path and the subsequent second set of valid portions of the second subsequent path.

F. A method comprising: receiving a plurality of nodes indicative of a perimeter of a region; determining, based at least in part on the plurality of nodes, a mesh; determining a graph connecting elements of the mesh; determining, based at least in part on the graph, a longest funneled path between pairs of nodes of the plurality of nodes; determining, based at least in part on the longest funneled path, a set of segments; performing an optimization associated with the set of segments to determine a coverage plan; and transmitting the coverage plan to a system configured to receive the coverage plan and control the system to traverse at least a portion of the coverage plan.

G. The method as described in clause F, wherein generating the set of segments comprises: determining a plurality of struts normal to segments of the longest funneled path; determining, based at least in part on a cost associated with a strut of the plurality of struts, an optimal point along the strut; determining, as a longest path, a path comprising the pair of nodes associated with the longest funneled path and the optimal point; generating at least one offset path from the longest path; and determining, as the set of segments, the longest path and one or more portions of the offset path.

H. The method as described in any of clauses F or G, wherein the cost comprises one or more of: a cost based at least in part on a curvature of the longest path at the optimal point, a cost based at least in part on a distance of the optimal point from a center of the strut, or a cost based at least in part on a distance of the optimal point from a perimeter of the region, and wherein determining the optimal point comprises determining a point along the strut which minimizes the cost.

I. The method as described in any of clauses F through H, wherein determining the set of segments comprises: determining, as a first side, a portion of the perimeter between the pair of nodes associated with the longest funneled path; determining, as a second side, a remaining portion of the perimeter between the pair of nodes not associated with the first side; generating a first initial offset segment associated with the first side and a second initial offset segment associated with the second side; determining, based at least in part on a minimum and a maximum offset from the first initial offset, a first path; determining, based at least in part on a minimum and a maximum offset from the second initial offset, a second path; determining a first set of valid portions of the first path; and determining a second set of valid portions of the second path, wherein the set of segments comprises the first initial offset, the second initial offset, the first set of valid portions of the first path, and the second set of valid portions of the second path.

J. The method as described in any of clauses F through I, further comprising performing one or more iterations comprising: determining, based at least in part on a minimum and maximum offset from a previously determined first set of valid portions, a first subsequent path; determining, based at least in part on a minimum and maximum offset from a previously determined second set of valid portions, a second subsequent path; and determining, based at least in part on the first subsequent path and the second subsequent path, a subsequent first set of valid portions and a subsequent second set of valid portions, wherein the set of segments further comprises the subsequent first set of valid portions of the first subsequent path and the subsequent second set of valid portions of the second subsequent path.

K. The method as described in any of clauses F through J, wherein performing the one or more iterations comprises performing a number of iterations based at least in part on one or more of: a predefined number, the subsequent first set of valid portions, the subsequent second set of valid portions, or a geometry of a portion of a subpolygon interior to the subsequent first and second sets of valid portions.

L. The method as described in any of clauses F through K, further comprising: determining, as a subpolygon, a portion of the region interior to the first and second subsequent paths, the subpolygon defined by a plurality of additional nodes; determining, based at least in part on the plurality of additional nodes, an additional longest funneled path between additional pairs of nodes of the plurality of additional nodes; determining a plurality of struts normal to the additional longest funneled path; determining, based at least in part on a cost associated with a strut of the plurality of struts, an optimal point along the strut; determining, as a longest path, a path comprising the additional pair of nodes associated with the additional longest funneled path and the optimal point; and generating an offset path from the longest path, wherein the set of segments comprises the longest path and at least a portion of the offset path.

M. The method as described in any of clauses F through L, wherein the cost is determined based at least in part on one or more of: a cost based at least in part on a curvature of the longest path at the optimal point, a cost based at least in part on a distance of the optimal point from a center of the strut, or a cost based at least in part on a distance of the optimal point from a perimeter of the subpolygon, and wherein determining the optimal point comprises determining a point along the strut which minimizes the cost.

N. The method as described in any of clauses F through M, wherein performing the optimization comprises performing an ant colony optimization.

O. The method as described in any of clauses F through N, wherein the system comprises an autonomous lawn mower, and wherein the plurality of nodes comprises a plurality of geolocations.

P. One or more non-transitory computer readable media having instructions stored thereon which, when executed by one or more processors, cause the one or more processors to perform operations comprising: receiving a plurality of nodes indicative of a perimeter of a region; determining, based at least in part on the plurality of nodes, a longest funneled path between pairs of nodes of the plurality of nodes; determining, based at least in part on the longest funneled path, a set of segments; and determining, based at least in part on the set of segments, a coverage plan.

Q. The one or more non-transitory computer readable media as described in clause P, wherein determining the set of segments comprises: determining a plurality of struts normal to and equally spaced along one or more portions of the longest funneled path; determining, based at least in part on a cost associated with a strut of the plurality of struts, an optimal point along the strut; determining, as a longest path, a path comprising the pair of nodes associated with the longest funneled path and the optimal point; generating at least one offset path from the longest path; and determining, as the set of segments, the longest path and one or more portions of the offset path.

R. The one or more non-transitory computer readable media as described in either clauses P or Q, wherein the cost comprises one or more of: a cost based at least in part on a curvature of the longest path at the optimal point, a cost based at least in part on a distance of the optimal point from a center of the strut, or a cost based at least in part on a distance of the optimal point from a perimeter of the polygon, and wherein determining the optimal point comprises determining a point along the strut which minimizes the cost.

S. The one or more non-transitory computer readable media as described in any of clauses P through R, wherein determining the set of segments comprises: determining, as a first side, a portion of the perimeter between the pair of nodes associated with the longest funneled path; determining, as a second side, a remaining portion of the perimeter between the pair of nodes not associated with the first side; determining a first initial offset segment associated with the first side and a second initial offset segment associated with the second side; determining, based at least in part on a minimum and a maximum offset from the first initial offset, a first path; determining, based at least in part on a minimum and a maximum offset from the second initial offset, a second path; determining a first set of valid portions of the first path; and determining a second set of valid portions of the second path, wherein the set of segments comprises the first initial offset, the second initial offset, the first set of valid portions of the first path, and the second set of valid portions of the second path.

T. The non-transitory computer readable media as described in any of clauses P through S, the operations further comprising: transmitting the coverage plan to an autonomous lawn mower configured to receive the coverage plan and traverse at least a portion of the region based at least in part on the coverage plan while mowing the at least a portion of the region.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the systems, techniques, and processes presented herein. Such systems, techniques, processes, etc. are not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g., A, AB, AB, ABC, ABB, etc.). When "and/or" is used, it should be understood that the elements may be joined in the alternative or conjunctive.

What is claimed is:

1. A system configured to generate a coverage plan, the system comprising:
    one or more processors; and
    one or more non-transitory computer readable media having instructions stored thereon which, when executed by the one or more processors, cause the one or more processors to perform operations comprising:
        receiving a plurality of nodes indicative of a perimeter of a region to be mowed;
        determining, based at least in part on the plurality of nodes, a plurality of triangles defining a triangle mesh;
        determining, based at least in part on the triangle mesh, a graph connecting the plurality of triangles;
        determining, based at least in part on the graph and a funnel algorithm, a longest funneled path between pairs of nodes of the plurality of nodes, the longest funneled path comprising one or more straight portions and indicative of a longest distance between the pairs of nodes and being interior to the perimeter of the region;
        determining, based at least in part on the longest funneled path, a set of segments;
        determining, as the coverage plan and by performing an optimization, one or more connections between the set of segments and an order in which to traverse the set of segments and the one or more connections;
        transmitting the coverage plan to an autonomous lawn mower; and
        controlling the autonomous lawn mower to traverse at least a portion of the coverage plan.

2. The system of claim 1, wherein determining the set of segments comprises:
    determining a plurality of struts normal to the one or more straight portions of the longest funneled path;

determining, based at least in part on a cost associated with a strut of the plurality of struts, an optimal point along the strut;

determining, as a longest path, a path comprising the pair of nodes associated with the longest funneled path and the optimal point;

generating at least one offset path from the longest path, the offset path being offset by one or more of a width of the autonomous lawn mower or an overlap amount; and determining, as the set of segments, the longest path and one or more portions of the offset path interior to the perimeter.

3. The system of claim 2, wherein the cost comprises one or more of:

a cost based at least in part on a curvature of the longest path at the optimal point, a cost based at least in part on a distance of the optimal point from a center of the strut, or a cost based at least in part on a distance of the optimal point from a perimeter of the region, and wherein determining the optimal point comprises determining a point along the strut which minimizes the cost.

4. The system of claim 1, wherein determining the set of segments comprises eroding the perimeter and wherein eroding the perimeter comprises:

determining, as a first side, a portion of the perimeter between the pair of nodes associated with the longest funneled path;

determining, as a second side, a remaining portion of the perimeter between the pair of nodes opposing the first side;

determining a first initial offset segment associated with the first side and a second initial offset segment associated with the second side, the first and second initial offset segments spaced at least a portion of a width of the autonomous lawn mower from the first and second sides, respectively;

determining, based at least in part on a minimum and a maximum offset from the first initial offset, a first path;

determining, based at least in part on a minimum and a maximum offset from the second initial offset, a second path;

determining a first set of valid portions of the first path; and determining a second set of valid portions of the second path, wherein the set of segments comprises the first initial offset, the second initial offset, the first set of valid portions of the first path, and the second set of valid portions of the second path.

5. The system of claim 4, wherein eroding the perimeter further comprises performing an iteration comprising:

determining, based at least in part on a minimum and maximum offset from a previously determined first set of valid portions, a first subsequent path;

determining, based at least in part on a minimum and maximum offset from a previously determined second set of valid portions, a second subsequent path; and determining, based at least in part on the first subsequent path and the second subsequent path, a subsequent first set of valid portions and a subsequent second set of valid portions, wherein the set of segments further comprises the subsequent first set of valid portions of the first subsequent path and the subsequent second set of valid portions of the second subsequent path.

6. A method comprising:

receiving a plurality of nodes indicative of a perimeter of a region;

determining, based at least in part on the plurality of nodes, a mesh;

determining a graph connecting elements of the mesh;

determining, based at least in part on the graph and a funnel algorithm, a longest funneled path between pairs of nodes of the plurality of nodes;

determining, based at least in part on the longest funneled path, a set of segments;

performing an optimization associated with the set of segments to determine a coverage plan;

transmitting the coverage plan to an autonomous lawn mower; and controlling the autonomous lawn mower to traverse at least a portion of the coverage plan.

7. The method of claim 6, wherein generating the set of segments comprises:

determining a plurality of struts normal to segments of the longest funneled path;

determining, based at least in part on a cost associated with a strut of the plurality of struts, an optimal point along the strut;

determining, as a longest path, a path comprising the pair of nodes associated with the longest funneled path and the optimal point;

generating at least one offset path from the longest path; and determining, as the set of segments, the longest path and one or more portions of the offset path.

8. The method of claim 7, wherein the cost comprises one or more of:

a cost based at least in part on a curvature of the longest path at the optimal point, a cost based at least in part on a distance of the optimal point from a center of the strut, or a cost based at least in part on a distance of the optimal point from a perimeter of the region, and wherein determining the optimal point comprises determining a point along the strut which minimizes the cost.

9. The method of claim 6, wherein determining the set of segments comprises:

determining, as a first side, a portion of the perimeter between the pair of nodes associated with the longest funneled path;

determining, as a second side, a remaining portion of the perimeter between the pair of nodes not associated with the first side;

generating a first initial offset segment associated with the first side and a second initial offset segment associated with the second side;

determining, based at least in part on a minimum and a maximum offset from the first initial offset, a first path;

determining, based at least in part on a minimum and a maximum offset from the second initial offset, a second path;

determining a first set of valid portions of the first path; and determining a second set of valid portions of the second path, wherein the set of segments comprises the first initial offset, the second initial offset, the first set of valid portions of the first path, and the second set of valid portions of the second path.

10. The method of claim 9, further comprising performing one or more iterations comprising:
   determining, based at least in part on a minimum and maximum offset from a previously determined first set of valid portions, a first subsequent path;
   determining, based at least in part on a minimum and maximum offset from a previously determined second set of valid portions, a second subsequent path; and
   determining, based at least in part on the first subsequent path and the second subsequent path, a subsequent first set of valid portions and a subsequent second set of valid portions,
   wherein the set of segments further comprises the subsequent first set of valid portions of the first subsequent path and the subsequent second set of valid portions of the second subsequent path.

11. The method of claim 10, wherein performing the one or more iterations comprises performing a number of iterations based at least in part on one or more of:
   a predefined number,
   the subsequent first set of valid portions,
   the subsequent second set of valid portions, or
   a geometry of a portion of a subpolygon interior to the subsequent first and second sets of valid portions.

12. The method of claim 10, further comprising:
   determining, as a subpolygon, a portion of the region interior to the first and second subsequent paths, the subpolygon defined by a plurality of additional nodes;
   determining, based at least in part on the plurality of additional nodes, an additional longest funneled path between additional pairs of nodes of the plurality of additional nodes;
   determining a plurality of struts normal to the additional longest funneled path;
   determining, based at least in part on a cost associated with a strut of the plurality of struts, an optimal point along the strut;
   determining, as a longest path, a path comprising the additional pair of nodes associated with the additional longest funneled path and the optimal point; and
   generating an offset path from the longest path,
   wherein the set of segments comprises the longest path and at least a portion of the offset path.

13. The method of claim 12, wherein the cost is determined based at least in part on one or more of:
   a cost based at least in part on a curvature of the longest path at the optimal point,
   a cost based at least in part on a distance of the optimal point from a center of the strut, or
   a cost based at least in part on a distance of the optimal point from a perimeter of the subpolygon, and
   wherein determining the optimal point comprises determining a point along the strut which minimizes the cost.

14. The method of claim 6, wherein performing the optimization comprises performing an ant colony optimization.

15. The method of claim 6,
   wherein the plurality of nodes comprises a plurality of geolocations.

16. One or more non-transitory computer readable media having instructions stored thereon which, when executed by one or more processors, cause the one or more processors to perform operations comprising:
   receiving a plurality of nodes indicative of a perimeter of a region;
   determining, based at least in part on the plurality of nodes, a mesh;
   determining a graph connecting elements of the mesh;
   determining, based at least in part on the graph and a funnel algorithm, a longest funneled path between pairs of nodes of the plurality of nodes;
   determining, based at least in part on the longest funneled path, a set of segments;
   performing an optimization associated with the set of segments to determine a coverage plan;
   transmitting the coverage plan to an autonomous lawn mower; and
   controlling the autonomous lawn mower to traverse at least a portion of the coverage plan.

17. The one or more non-transitory computer readable media of claim 16, wherein determining the set of segments comprises:
   determining a plurality of struts normal to and equally spaced along one or more portions of the longest funneled path;
   determining, based at least in part on a cost associated with a strut of the plurality of struts, an optimal point along the strut;
   determining, as a longest path, a path comprising the pair of nodes associated with the longest funneled path and the optimal point;
   generating at least one offset path from the longest path; and
   determining, as the set of segments, the longest path and one or more portions of the offset path.

18. The one or more non-transitory computer readable media of claim 17, wherein the cost comprises one or more of:
   a cost based at least in part on a curvature of the longest path at the optimal point,
   a cost based at least in part on a distance of the optimal point from a center of the strut, or
   a cost based at least in part on a distance of the optimal point from a perimeter of the region, and
   wherein determining the optimal point comprises determining a point along the strut which minimizes the cost.

19. The one or more non-transitory computer readable media of claim 16, wherein determining the set of segments comprises:
   determining, as a first side, a portion of the perimeter between the pair of nodes associated with the longest funneled path;
   determining, as a second side, a remaining portion of the perimeter between the pair of nodes not associated with the first side;
   determining a first initial offset segment associated with the first side and a second initial offset segment associated with the second side;
   determining, based at least in part on a minimum and a maximum offset from the first initial offset, a first path;
   determining, based at least in part on a minimum and a maximum offset from the second initial offset, a second path;
   determining a first set of valid portions of the first path; and
   determining a second set of valid portions of the second path,
   wherein the set of segments comprises the first initial offset, the second initial offset, the first set of valid portions of the first path, and the second set of valid portions of the second path.

\* \* \* \* \*